United States Patent
Schelstraete et al.

(10) Patent No.: US 12,500,640 B2
(45) Date of Patent: *Dec. 16, 2025

(54) BEAMFORMER SOLICITED SOUNDING

(71) Applicant: MAXLINEAR, INC., Carlsbad, CA (US)

(72) Inventors: Sigurd Schelstraete, Menlo Park, CA (US); Hossein Dehghan-Fard, Diablo, CA (US); Debashis Dash, Newark, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,281

(22) Filed: Jun. 16, 2022

(65) Prior Publication Data

US 2022/0321188 A1 Oct. 6, 2022

Related U.S. Application Data

(63) Continuation of application No. 16/403,073, filed on May 3, 2019, now Pat. No. 11,394,441.

(Continued)

(51) Int. Cl.
*H04B 7/06* (2006.01)
*H04W 84/12* (2009.01)

(52) U.S. Cl.
CPC .......... *H04B 7/0626* (2013.01); *H04B 7/0617* (2013.01); *H04W 84/12* (2013.01)

(58) Field of Classification Search
CPC ............ H04L 25/0226; H04L 25/0224; H04B 7/0456; H04B 7/0617; H04B 7/0626; H04B 7/088; H04B 7/0695; H04W 84/12

(Continued)

(56) References Cited

U.S. PATENT DOCUMENTS 8,665,795 B2   3/2014   Ketchum et al.
8,804,612 B1   8/2014   Chen et al.
(Continued)

FOREIGN PATENT DOCUMENTS

CN   102845101 A   12/2012
CN   103427887 A   12/2013
(Continued)

OTHER PUBLICATIONS

Samsung, "Discussion on beam indication for UL transmission," 3rd Generation Partnership Project (3GPP) TSG RAN WG1 Meeting 90bis, Prague, Czech Republic, R1-1717620, Oct. 9-13, 2017, 3 pages.

(Continued)

*Primary Examiner* — Candal Elpenord
(74) *Attorney, Agent, or Firm* — Buchalter; Jason W. Croft

(57) ABSTRACT

Example implementations are directed to methods and systems employing a solicited sounding protocol that includes an efficient communication sequence for operating a wireless transceiver transmitting a sounding trigger to one or more beamformees via a forward channel, receiving at least one dedicated training signal from the one or more beamformees via a reverse channel in response to the sounding trigger, and for each of the received dedicated training signal. The method also includes estimating forward CSI derived based on the dedicated training signal from an associated beamformee; and where subsequent packets are precoded with precoding derived from the forward CSI for transmission to the associated beamformee via the forward channel. Example aspects including scheduling multiple dedicated training signals from one or more beamformees based on a single sounding trigger.

20 Claims, 15 Drawing Sheets

Related U.S. Application Data

(60) Provisional application No. 62/667,405, filed on May 4, 2018.

(58) Field of Classification Search
USPC .................................................. 370/329–330
See application file for complete search history.

(56) References Cited

U.S. PATENT DOCUMENTS

| | | | |
|---|---|---|---|
| 9,154,969 | B1 | 10/2015 | Srinivasa et al. |
| 9,843,097 | B1 | 12/2017 | Zhang et al. |
| 11,394,441 | B2 | 7/2022 | Schelstraete et al. |
| 11,552,828 | B2 | 1/2023 | Schelstraete et al. |
| 12,088,434 | B2 | 9/2024 | Schelstraete et al. |
| 2007/0230373 | A1 | 10/2007 | Li et al. |
| 2008/0095268 | A1 | 4/2008 | Aldana |
| 2010/0322166 | A1 | 12/2010 | Sampath et al. |
| 2011/0051636 | A1 | 3/2011 | Van Nee et al. |
| 2011/0261708 | A1 | 10/2011 | Grandhi |
| 2012/0099530 | A1 | 4/2012 | Morioka et al. |
| 2012/0328034 | A1 | 12/2012 | Nabar et al. |
| 2013/0286959 | A1 | 10/2013 | Lou et al. |
| 2014/0010319 | A1* | 1/2014 | Baik ............... H04B 7/0413 375/267 |
| 2014/0098701 | A1 | 4/2014 | Sohn et al. |
| 2015/0094103 | A1 | 4/2015 | Wang et al. |
| 2015/0131577 | A1 | 5/2015 | Kim et al. |
| 2015/0146807 | A1 | 5/2015 | Zhang et al. |
| 2015/0270879 | A1 | 9/2015 | Chen et al. |
| 2015/0382333 | A1 | 12/2015 | Seok |
| 2016/0233932 | A1 | 8/2016 | Hedayat et al. |
| 2016/0255603 | A1 | 9/2016 | Venkatraman et al. |
| 2016/0261327 | A1* | 9/2016 | Merlin ............... H04L 1/0026 |
| 2016/0262051 | A1 | 9/2016 | Merlin et al. |
| 2016/0301452 | A1* | 10/2016 | Kwon ............... H04B 7/0617 |
| 2016/0330732 | A1 | 11/2016 | Moon et al. |
| 2017/0195016 | A1 | 7/2017 | Alexander et al. |
| 2017/0245246 | A1 | 8/2017 | Ghosh et al. |
| 2017/0257859 | A1* | 9/2017 | Li ............... H04L 5/0044 |
| 2017/0273112 | A1* | 9/2017 | Lou ............... H04W 72/121 |
| 2018/0167177 | A1* | 6/2018 | Huang ............... H04W 84/12 |
| 2018/0167903 | A1 | 6/2018 | Fan et al. |
| 2018/0206274 | A1 | 7/2018 | Cherian et al. |
| 2018/0310133 | A1 | 10/2018 | Ramasamy et al. |
| 2018/0310273 | A1 | 10/2018 | Chu et al. |
| 2019/0020505 | A1 | 1/2019 | Hoffman et al. |
| 2019/0041509 | A1 | 2/2019 | Jiang et al. |
| 2019/0081664 | A1 | 3/2019 | Vermani et al. |
| 2019/0132155 | A1* | 5/2019 | Jiang ............... H04W 74/08 |
| 2019/0132762 | A1 | 5/2019 | Zhu et al. |
| 2019/0191325 | A1* | 6/2019 | Du ............... H04L 5/00 |
| 2023/0105580 | A1 | 4/2023 | Schelstraete et al. |
| 2024/0430134 | A1 | 12/2024 | Schelstraete et al. |

FOREIGN PATENT DOCUMENTS

| | | |
|---|---|---|
| CN | 104321998 A | 1/2015 |
| CN | 106230566 A | 12/2016 |
| CN | 107409012 A | 11/2017 |
| CN | 107852617 A | 3/2018 |
| EP | 3261380 A1 | 12/2017 |
| EP | 3189609 B1 | 9/2020 |
| WO | 2016140872 A1 | 9/2016 |
| WO | 2017037994 A1 | 3/2017 |
| WO | 2019023173 A1 | 1/2019 |
| WO | 2019213603 A1 | 11/2019 |

OTHER PUBLICATIONS

3GPP TS 38.331: "3rd Generation Partnership Project; Technical Specification Group Radio Access Network, NR, Radio Resource Control (RRC) protocol specification (Release 15)", 3GPP TS 38.331 V15.1.0, Mar. 2018, pp. 1-269.

Office Action for Korean Patent Application No. 10-2020-7031877 mailed on Aug. 4, 2022, 18 Pages.

International Preliminary Report on Patentability for International Application No. PCT/US2019/030711, mailed Nov. 19, 2020, 9 Pages.

International Search Report and Written Opinion for International Application No. PCT/US2019/030711, mailed Jul. 23, 2019, 12 Pages.

Non-Final Office Action for U.S. Appl. No. 18/062,816, dated Sep. 12, 2023, 12 pages.

Notice of Allowance for U.S. Appl. No. 18/062,816, dated Apr. 24, 2024, 08 pages.

Notice of Allowance for U.S. Appl. No. 18/062,816, dated Jan. 8, 2024, 8 pages.

Office Action for Chinese Application No. 201980030224.8, dated Dec. 29, 2023, 14 pages.

Corrected Notice of Allowance for U.S. Appl. No. 18/062,816, dated Aug. 7, 2024, 4 pages.

Office Action for Korean Application No. 20237029794, dated Jul. 1, 2024, 14 pages.

Corrected Notice of Allowance for U.S. Appl. No. 18/062,816, dated Jul. 23, 2024, 5 pages.

Li X., et al., "Multi-cell Massive MIMO Coordinated Beamforming for Transmit Power Minimization with Imperfect CSIT", 26th Annual International Symposium on Personal, Indoor, and Mobile Radio Communications (PIMRC), IEEE, 2015, pp. 344-349.

Office Action for Chinese Application No. 201980030224.8, dated May 20, 2024, 10 pages.

Tang J., et al., "An Iterative Beamforming Method for Millimeter Wave Phased Array", Journal of Xidian University (Natural Science), Dec. 31, 2017.

Office Action for Korean Patent Application No. 10-2023-7029794 mailed Feb. 5, 2025, 6 pages with machine translation.

Office Action of European Patent Application No. 19725811.4 mailed Jan. 31, 2023, 10 pages.

\* cited by examiner

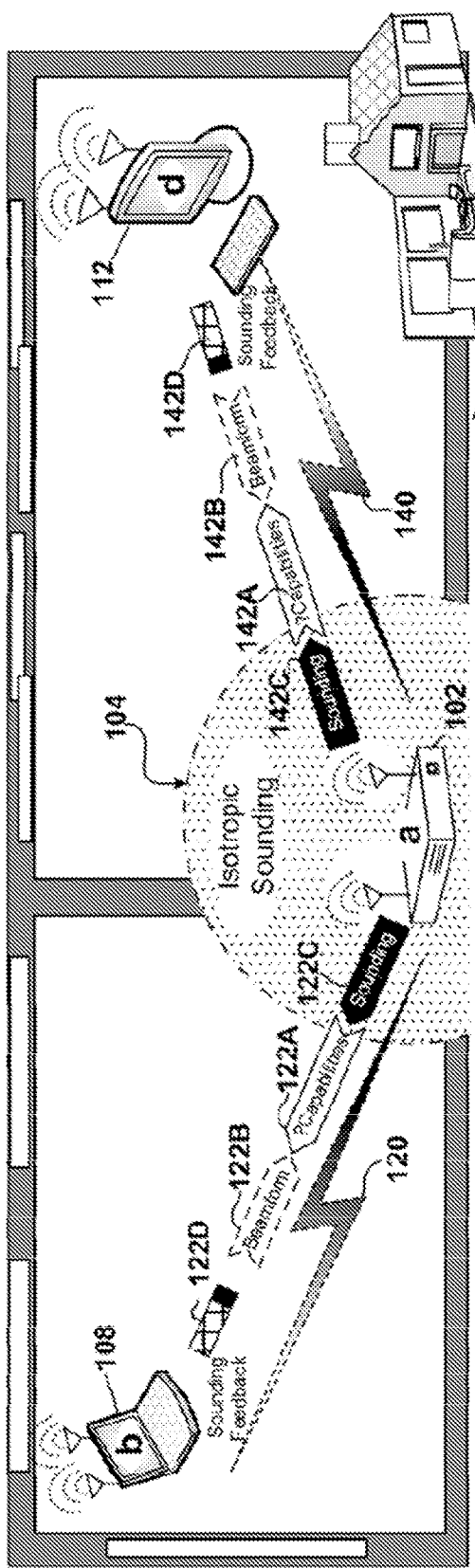
FIG. 1A    PRIOR ART    Channel Soundings => Ch. Matrices
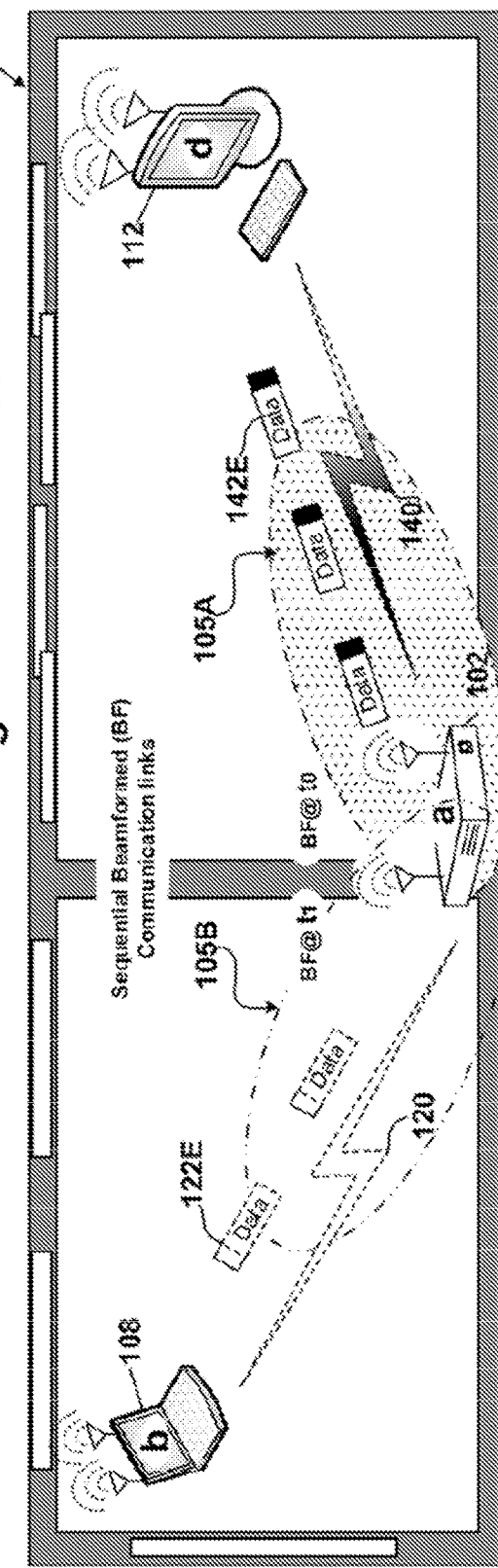
FIG. 1B    PRIOR ART    MIMO BeamSteered Communications <= Ch. Matrices

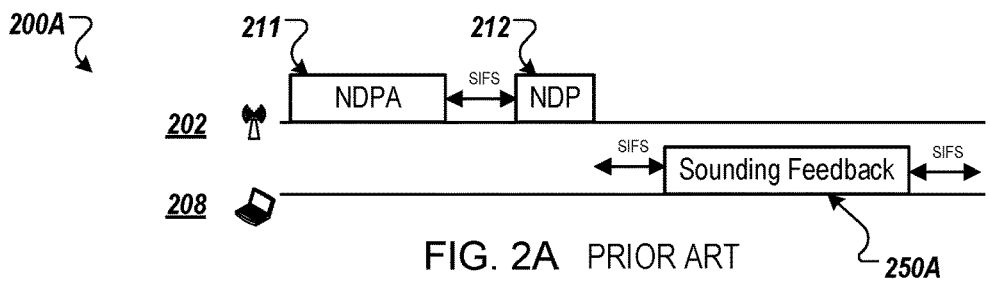
FIG. 2A PRIOR ART
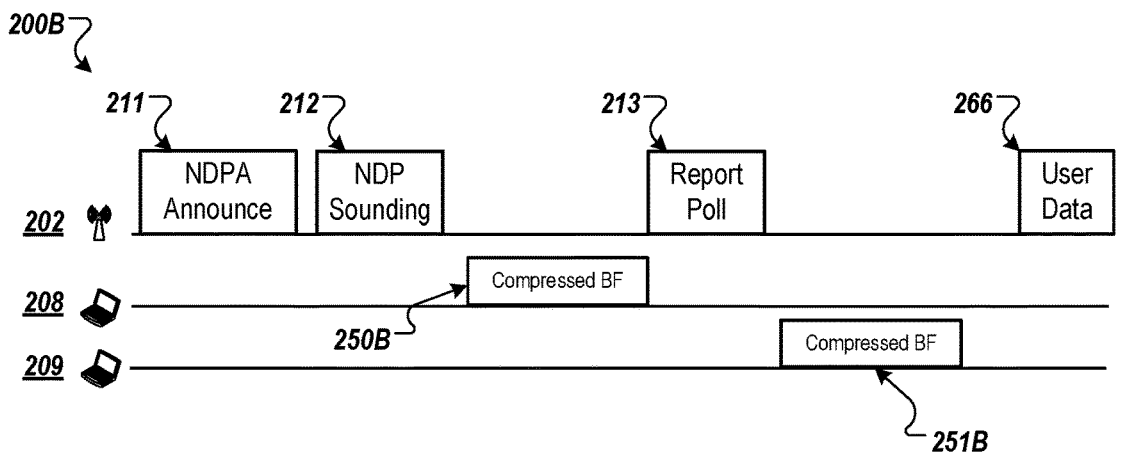
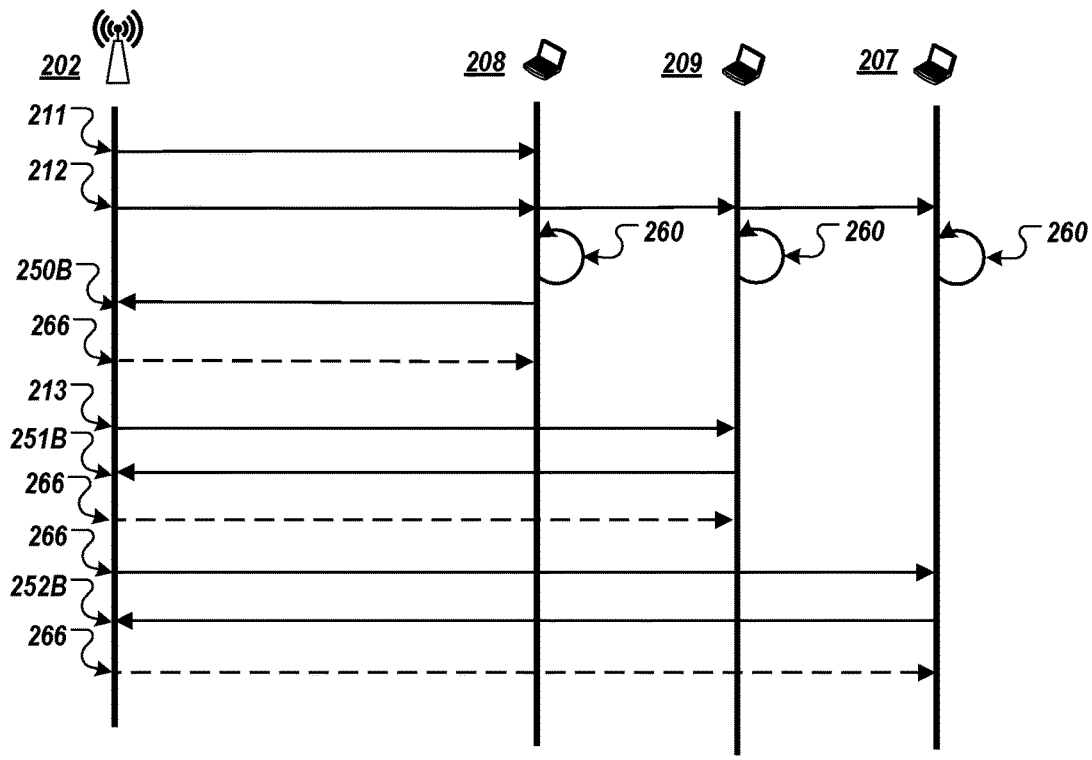
FIG. 2B PRIOR ART

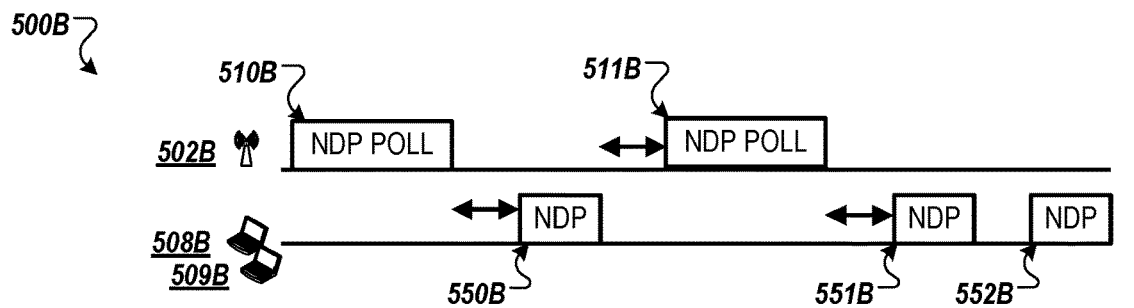
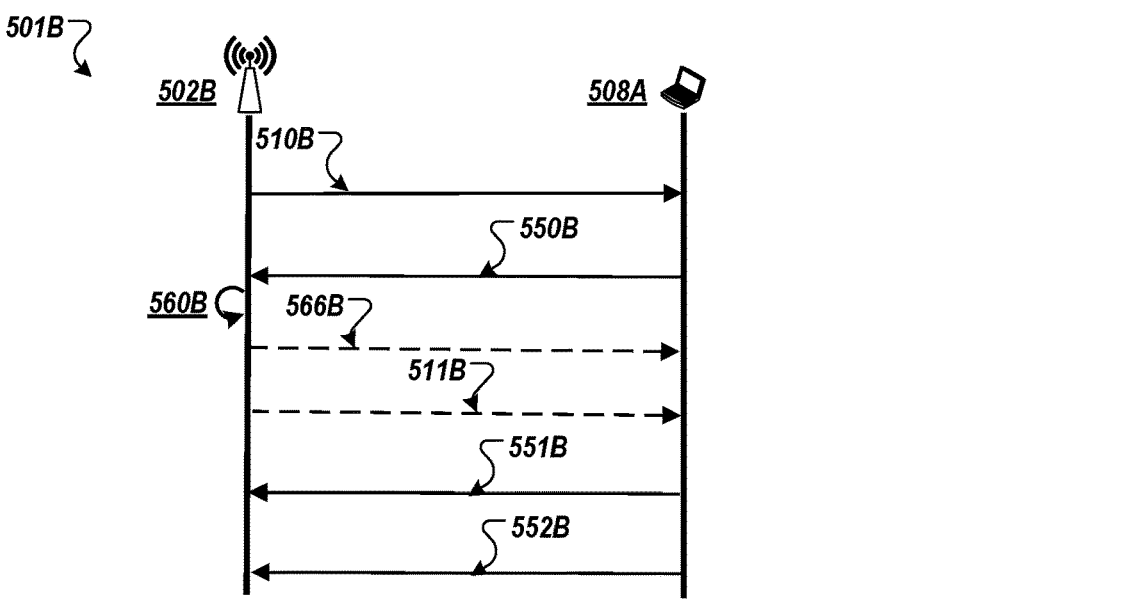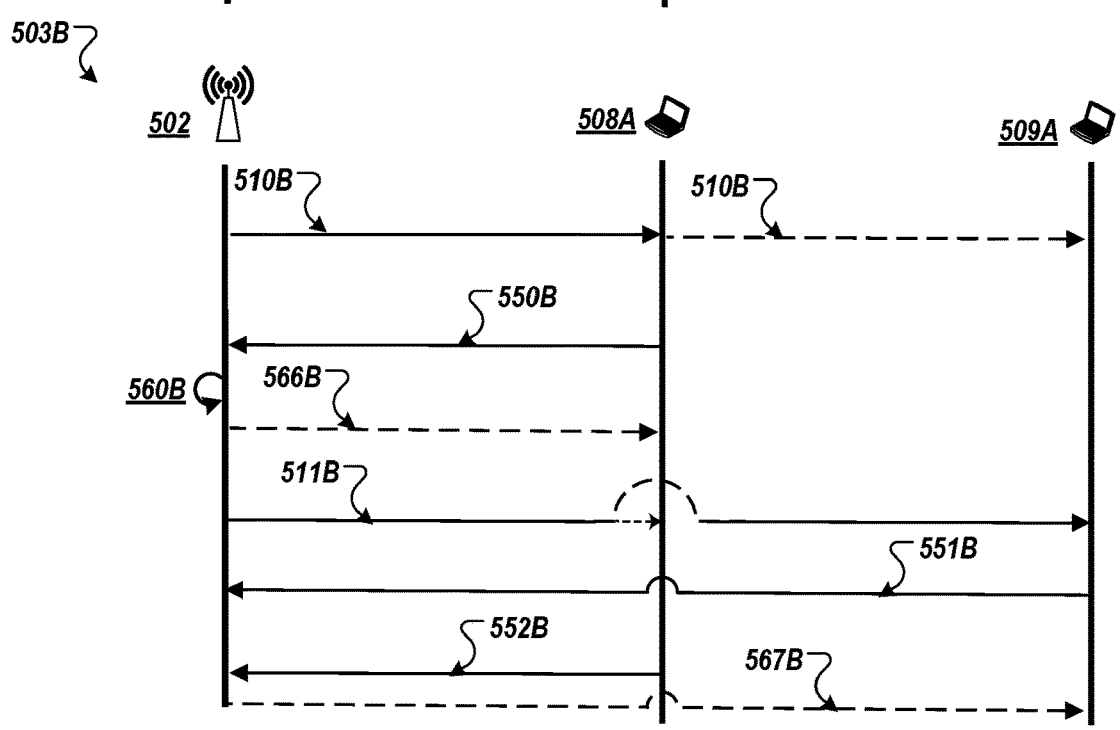
FIG. 5B

BEAMFORMER SOLICITED SOUNDING

CROSS REFERENCE TO RELATED APPLICATION

This application is a continuation of U.S. patent application Ser. No. 16/403,073, filed on May 3, 2019; which claims the benefit of U.S. Patent Application Ser. No. 62/667,405, filed on May 4, 2018; the disclosures of which are incorporated herein by reference in their entireties.

FIELD

Aspects of the present disclosure relate in general to sounding for wireless communications operations and specifically to systems and methods for beamformer solicited sounding and operations thereof.

BACKGROUND

Home, outdoor, and office networks, a.k.a. wireless local area networks (WLAN) are established using a device called a Wireless Access Point (WAP). The WAP may include a router. The WAP wirelessly couples all the devices of the home network, e.g., wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented (e.g., "a", "b", "g", "n", "ac", "ad"). Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology for sharing a single communication medium, by having a contending communication device back off and retry access if a collision on the wireless medium is detected (e.g., if the wireless medium is in use).

Communications on the single communication medium are identified as "simplex" meaning, one communication stream from a single source node to one or more target nodes at one time, with all remaining nodes capable of "listening" to the subject transmission. Starting with the IEEE 802.1 lac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with single antenna single stream or multiple-antenna multi-stream transceivers concurrently, thereby increasing the time available for discrete MIMO video links to wireless HDTVs, computers tablets and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units.

The IEEE 802.11n and 802.11ac standards support increasing degrees of complexity in the signal processing required of fully compliant WLAN nodes including beamforming capability for focused communication of user data. In order to characterize the multipath communication channel between the WAP and each station a MIMO sounding is conducted. An explicit sounding as specified in the IEEE 802.11n and 802.11ac standards consists of the transmission of a known sequence of packets from the WAP to each associated station, then each associated station processes the sequence of packets to perform measurements and calculations to generate a detailed sounding response from the station characterizing the communication channel between the WAP and itself. The WAP traditionally uses the explicit sounding response to focus its MIMO antennas in a manner which improves either or both signal strength at the station or downlink throughput thereto.

With the growing variety and number of stations on a wireless network, there is increasing need for improved sounding processes that can efficiently coordinate communication services to a larger number of devices while decreasing transmission overhead from sounding and the processing overhead required for sounding stations.

SUMMARY

Methods and systems employing a solicited sounding protocol that includes an efficient communication sequence, improves bandwidth for sounding dialog, and reduces processing required by beamformees among other benefits. In an example, a transmitter determines a sounding control scheme for one or more receivers, transmits a sounding trigger to the one or more receivers based on the sounding control scheme, receives at least one dedicated training signal from the one or more receivers in response to the sounding trigger, and for each received dedicated training signal, the transmitter estimates forward channel state information (CSI) derived based on the dedicated training signal from an associated receiver.

Example implementations include methods and systems for operating a wireless transceiver include transmitting a sounding trigger to one or more beamformees via a forward channel, receiving at least one dedicated training signal from the one or more beamformees via a reverse channel in response to the sounding trigger, and for each of the received dedicated training signal. The method also includes estimating forward CSI derived based on the dedicated training signal from an associated beamformee, and subsequent packets can be precoded with precoding derived from the forward CSI for transmission to the associated beamformee via the forward channel.

Example implementations include methods and systems with a wireless transceiver apparatus for a wireless local area network supporting wireless communications, and the wireless transceiver apparatus including a plurality of antenna. The wireless transceiver apparatus also includes a plurality of components coupled to one another to form transmit and receive chains; and a solicitor module circuit to transmit a sounding trigger, via a forward channel, to solicit multiple dedicated training signal from one or more beamformees, and the dedicated training signals are to be processed for estimating a forward CSI for transmission of subsequent packets to associated beamformee.

Example implementations include methods and systems for operating a wireless transceiver including transmitting a sounding trigger to one or more beamformees via a forward channel, receiving at least one dedicated training signal with timing information from the one or more beamformees via a reverse channel in response to the sounding trigger, and for each received dedicated training signal. The method also includes estimating a forward channel state information derived based on the dedicated training signal from an associated beamformee; and where subsequent packets are precoded with precoding derived from the forward CSI for transmission to the associated beamformee via the forward channel, and determining packet transmit and receive timestamps based on the timing information. Other embodiments of this aspect include corresponding communication protocols, networking systems, apparatus, and computer programs recorded on one or more computer storage devices, each configured to perform the actions of the methods.

The methods and systems are implemented using one or more networking devices and/or systems. Other features and advantages of the present inventive concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which:

FIGS. 1A-B illustrate prior art examples of WLAN channel sounding and beamformed communications.

FIGS. 2A-D illustrate prior art sounding and packet diagram examples.

FIGS. 5A-G illustrate example sequences of solicited sounding in accordance with various example implementations.

DETAILED DESCRIPTION

Figure 2C:
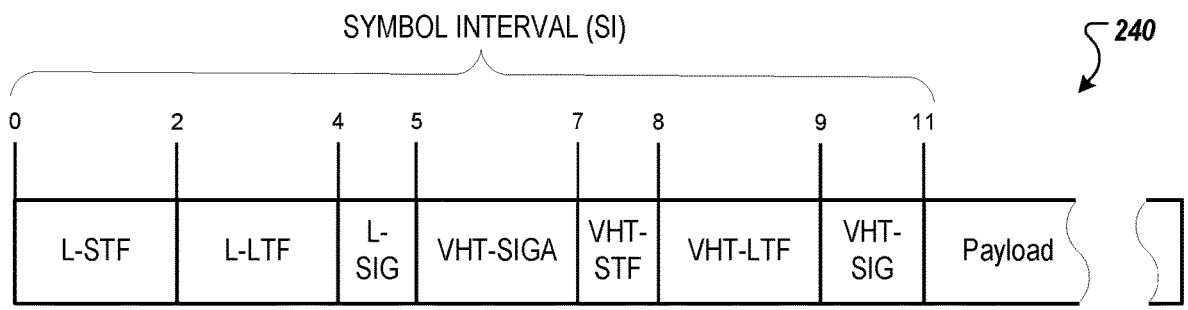

The following detailed description provides further details of the figures and example implementations of the present application. Reference numerals and descriptions of redundant elements between figures are omitted for clarity. Terms used throughout the description are provided as examples and are not intended to be limiting.

Traditional explicit sounding approaches start with a beamformer (e.g., access point, transmitter, etc.) sending a pair of packets with an announcement frame and dedicated training signal (e.g., a Null Data Packet Announcement (NDPA) followed by a null data packet (NDP)) to a beamformee (e.g., station, client, receiver, etc.) so that the beamformee can measure the received dedicated training signal for characteristics of the forward communication channel (e.g., from the beamformer to the beamformee). The beamformee then traditionally generates a detailed sounding feedback payload that is returned to the beamformer. The beamformer traditionally uses the returned sounding feedback to determine precoding that can be used for subsequent transmissions to the beamformee. The beamformer uses the sounding feedback to improve subsequent transmissions.

In the complex multi-path channel environment encountered by multiple input multiple output (MIMO) transmissions the feedback of link channel matrices consumes a considerable amount of airtime due to amount of data that has to be transmitted to characterize the multipath channel and a low modulation and coding schema (MCS) at which the conventional detailed sounding feedback is transmitted consuming considerable network resources. Thus, each explicit sounding consumes precious airtime of the network.

Since explicit sounding uses sounding feedback for the forward channel to determine precoding for the forward channel, explicit sounding is generally more accurate than estimating the forward channel based on the reverse channel as in implicit sounding. However, explicit sounding generally requires additional overhead and the sounding feedback received from beamformee can be rather large and thus reduces availability of airtime for other transmissions.

Traditional implicit sounding approaches start with a beamformee opportunistically sending packets to the beamformer so that the beamformer can measure the received packets to determine characteristics of the reverse channel information (e.g., from the beamformee to the beamformer) that are then used to attempts to estimate the forward channel back to the beamformee. However, traditional implicit sounding fails to manage sounding among several beamformees in an efficient coordinated framework. For example, since in traditional implicit sounding approaches the beamformee controls initiation of a sounding process, the beamformer is unable to update the CSI as data communications degrade. Further, the beamformee in implicit sounding approaches is only interested in its own sounding process and fails to account for the sounding needs of other station or network resources over time.

With the growing variety and number of nodes on a wireless network, there is increasing need for improved sounding protocols that can efficiently coordinate communication services to a larger number of devices while decreasing transmission overhead from sounding and the processing overhead for sounding required by client nodes (e.g., beamformees).

Aspects of example implementations described herein relate to systems and methods for a solicited sounding framework that is initially initiated by the beamformer, requires minimal processing resources by the beamformees, and can coordinate multiple soundings sequences among several beamformees. The solicited sounding framework provides improved transmission overhead for sounding and reduces the processing overhead for sounding required by beamformees. In an example implementation described herein, a beamformer transmits a sounding trigger to solicit a dedicated training signal frame from the beamformee. A sounding trigger is a packet sent by a transmitter to at least one targeted station that instructs the station(s) to send one or more dedicated training signals to the transmitter. A single sounding trigger can indicate for the station to send a number of dedicated training signals and/or a schedule for sending the dedicated training signals along with other configurable parameters related to the dedicated training signals or transmission thereof. A single sounding trigger can also indicate for multiple stations to send a number of dedicated training signals.

A dedicated training signal is a packet sent by a beamformee to the beamformer that does not require a payload. A transmitted dedicated training signal can be processed to estimate channel information between a sender and recipient. The beamformee processes sounding trigger and responds with one or more dedicated training signals to be sent at coordinated times based on the instructions indicated by the sounding trigger.

The beamformer can receive multiple responses to a single sounding trigger without additional prompting of beamformees. The sounding trigger can include additional instructions for responding and does not require the beamformer to send an announcement packet with the sounding trigger or prompting for additional dedicated training signals. The beamformee responds to the sounding trigger with one or more dedicated training signal based on the instructions accompanying the trigger. The dedicated training signal requires substantially less overhead than traditional sounding feedback.

Example aspect of the solicited sounding framework include an efficient sounding sequence between an access point and one or more stations by reducing the number of transmissions to initiate soundings as well as the amount of bandwidth or airtime for determining CSI for the forward channel as compared to explicit sounding.

In the solicited sounding framework, the beamformee (e.g., a station, receiver, etc.) sends the dedicated training signal to a beamformer (e.g., an access point, transmitter, a transceiver station, etc.) that can be processed to estimate reverse channel information about the channel in the direction of the beamformee to the beamformer. The beamformer measures the received dedicated training signal to determine characteristics of the reverse channel information (e.g., from the beamformee to the beamformer) that are then used to attempts to estimate the forward channel back to the beamformee.

The solicited sounding framework has improved performance and efficiency over traditional explicit sounding and traditional implicit sounding. For example, the solicited sounding framework uses a single sounding trigger rather than requiring the beamformer to send multiple packets (e.g., NDPA and NDP) and prompts. Further, the dedicated training signal allows the beamformee to respond with minimal processing and bandwidth rather than requiring measurement of the channel, generation of detailed sounding feedback, and transmission of a large set of detailed sounding feedback (e.g., compressed feedback reports) that can consume significant processing and network resources.

Moreover, the solicited sounding framework allows the beamformer to initiate the sounding process and coordinate several dedicated training signals from multiple beamformees over a period of time rather than sending several prompts or waiting for the beamformee to opportunistically send packets. Additional aspects of the solicited sounding framework, as discussed herein, include coordinated sounding for several receivers with different capabilities, configurable sounding characteristics, integrated ranging capabilities, etc.

In an example implementation, a wireless transceiver transmits a sounding trigger to one or more beamformees via a forward channel, receives at least one dedicated training signal from the one or more beamformees via a reverse channel in response to the sounding trigger. For each of the received dedicated training signal, the transceiver estimates forward CSI derived based on the dedicated training signal from an associated beamformee to improve transmission of subsequent communications of data an associated beamformee (e.g., data packets precoded with precoding derived from the forward CSI for transmission to the associated beamformee via the forward channel).

The solicited sounding framework enables improved quality of data communications by instructing the beamformee to send multiple dedicated training signals over time without additional prompts so that the beamformer can use the multiple dedicated training signals to re-sound the link with updated CSI. Further, the beamformer can send updated sounding triggers to maintain coordinated sounding sequences with the one or more beamformees to efficiently maintain communication links within the network. In an example, the beamformer sends another sounding trigger in response to detecting changes in transmission quality, network resources, or performance of one or more of the beamformees. For example, as data communications degrade with one or more of the beamformees, the beamformer can send another sounding trigger to update a sounding interval or training signal format indicated by a previous sounding trigger.

In other example implementations, the efficiencies of the solicited sounding framework can be utilized for streamlining or supporting other networking applications (e.g., motion tracking, building automation, etc.) in addition to sounding. In an example, the transmission between the beamformer and beamformee of the solicited sounding framework can be adapted to efficiently synchronize timing between stations, ranging functions, etc.

FIGS. 1A-B illustrate prior art examples of WLAN channel sounding and beamformed communications. FIG. 1A illustrate channel soundings with intermittent sounding packages sent from the WAP identifying one or more station nodes from which prior art sounding feedback is requested. Traditional soundings packages include multiple elements including an announcement packet with a probe packet (e.g., an NDP sounding packet). The response to each intermittent sounding packages from the recipient station node contains detailed information that quantify the characteristics of the channel between it and the station node. The transmitter processes this detailed information. Soundings packages, whether sent from a device with a single antenna or multiple antenna, exhibit RF signal strengths to allow the recipient device to identify the link channel characteristics.

In FIG. 1A the WAP 102 is shown setting up communication links 120 and 140 with wireless station nodes 108 and 112 respectively within location 100. Each link pair exchanges capabilities, (e.g., 122A-B on link 120 and capabilities exchange, 142A-B on link 140). During this exchange the number of antenna, the number of streams, the coding and beamforming support capabilities of each device are exchanged. Next an initial explicit sounding request and response takes place, 122C-D on link 120 and 142C-D on link 140. The sounding package is sent using a radio frequency (RF) signal strength 104. Upon receipt of the sounding package, the recipient station(s) determine changes in amplitude and phase to the sounding transmission brought about the link channel e.g. fading, attenuation, and phase shift and passes indicia of these channel characteristics as detailed sounding feedback response packet(s), 122D, 142D, back to the WAP where they are immediately used to set up beamforming of subsequent data communications as shown in FIG. 1B.

The IEEE 802.11n and 802.11ac standards support increasing degrees of complexity in the signal processing required of fully compliant WLAN nodes including beamforming capability for focused communication of user data. One of the many capabilities of a fully compliant WLAN node under either of these standards is the ability to focus the signal strength of a transmitted communication toward a receiving device. Doing so requires multiple antenna and means for independently controlling the phase and amplitudes of the communication signals transmitted thereon. A baseband component of the WAP or station called a spatial mapper takes as input the independent communication streams for each antenna together with a steering matrix, a.k.a. beamforming matrix, determined during a prior sounding of the channel as shown in FIG. 1A. The steering matrix contains complex coefficients corresponding to the discrete phase and amplitude adjustments to each antenna's communication streams which provide the required focused signal strength to the composite of the signals transmitted from all antennas. The steering matrix used for subsequent transmissions is derived from the prior sounding as shown in FIG. 1A.

In FIG. 1B the WAP is shown using the sounding feedback to set up subsequent data communications with its link partners, e.g. stations 108, 112. Based on supported capabilities of the transmitter and receiver, the detailed sounding feedback is used to establish subsequent beamformed data communications. Beamforming increases the received signal strength and is achieved by independent changes in phase and or amplitude of the signal transmitted from each of the transmit antennas which collectively steer the transmit power footprint toward the intended recipient station(s), using the CSI obtained in the detailed sounding feedback response packets (See e.g., 122D, 142D of FIG. 1A).

A detailed sounding feedback response packet is typically received in response to each sounding package. WAP 102 is illustrated at time $t_0$ using multiple antenna to beamform 105A downlink data communication packets 142E on link 140 to station 112. Subsequently at time $t_1$ WAP 102 is illustrated beamforming 105B downlink data communication packets 122E on link 120 to station 112.

FIGS. 2A-D illustrate prior art examples of sounding and a packet diagram. FIG. 2A illustrates a Prior Art sounding diagram. Wireless communication protocols prescribe that packet headers include various preamble fields with known sequences to allow a receiving station to synchronize reception with packet boundaries and to determine the received channel. A typical operation of a WAP includes transmitter and receiver sounding sequence that starts with a pair of packets (e.g., an announcement and an NDP) that can be sent periodically (e.g. at 100 millisecond intervals) to start a sounding sequence, followed by a Short Interframe Space (SIFS), and a sounding response. During the sounding sequence one or more downstream or upstream links are probed to determine the channel characteristics thereof and using the CSI in the feedback from the sounding the beamforming matrix for each link subject to the sounding is determined. The soundings are conducted on a per link basis, and further may be either a downlink or an uplink sounding. The sounding feedback is different for each link. During the contention based interval carrier sense multiple access (CSMA) is used as a medium access control (MAC) methodology to allow any station to seize control of the channel and send uplink user data communications thereon to the transmitter 202.

Conventional explicit sounding protocols have the transmitter 202 send sounding packages with announcement frames 211, null data packet (NDP) 212 frames, and response frames as illustrated in 200A, 200B, and 201C of FIGS. 2A and 2B. A traditional sounding package includes a pair of packets where the NDPA 211 packet precedes a NDP 212 packet and identifies the receiving station(s) 208 which are requested to share the channel analysis (e.g., CSI) performed by the beamformee (e.g., receiving station 208) with the beamformer (e.g., transmitter 202).

In the pair of packets, the NDPA 211 indicates which stations are to respond to the next NDP 212 sounding frame and describes the NDP frame dimensions. Following the NDPA 211, the transmitter 202 sends the sounding NDP 212 as a broadcast to be processed by the identified receiving station(s) 208. In response to receiving the NDP 212 broadcast, the identified beamformee performs a series of steps to measures the RF channel characteristics, process, and generate a steering matrix with channel measurements as parts of a detailed sounding feedback response packet 250. After the beamformee receiving station(s) 208 completes the series of steps, the station 208 responds to the NDPA 211 and NDP 212 with a detailed sounding feedback response packet 250.

FIG. 2B is a Prior Art sounding diagrams 200B and 201B of explicit sounding for sequential soundings and data communication. An explicit sounding of the link channels between the transmitter 202 and station 208 and the transmitter 202 and station 209 are shown in 200B and 201B. The sounding sequence includes the transmitter 202 sending the pair of sounding packets, NDPA 211 and NDP 212, and in response the targeted station 208 (after significant processing 260) sends back a compressed detailed sounding feedback response packet 250A. The transmitter then must send a report poll packet 213 at time to prompt the next station 209 from which detailed sounding feedback generation is requested.

A header of the NDP packet 212 contains a ubiquitous preamble field that is used for channel estimation, which in the case of the IEEE 802.11ac standard is identified as a VHT-LTF field of FIG. 2C. The VHT-LTF field (e.g., a channel estimation or sounding field), contains a long training sequence used for MIMO channel estimation by the receiver station 208. Each recipient station 207, 208, 209 is then required to determine the corresponding beamsteering matrix required to adjust the phase and amplitude for subsequent MIMO transmissions by the transmitter 202 so as to update the received signal strength at the receiving station.

Each beamformee station 207, 208, 209, is required to perform significant processing of the NDP 260 to determine the detailed sounding feedback based on matrices by performing a singular value decomposition (SVD) on the H matrix for each sub-channel or tone that requires considerable processing resources (e.g., power, time, processor cycles, memory, etc.) to complete. The Signal-to-Noise Ratio (SNR) matrix is derived by scaling the SVD's sigma L matrix. Then each station waits for the transmitter to send another packet (e.g., a report poll 213) to prompt a response, and only then does the beamformee station send a single detailed sounding feedback in response to each report poll 213. That is, a first target station 208 only responds with a detailed beamforming feedback packet 250B containing CSI (e.g., a payload) when prompted. If the receiving station is IEEE 802.11n compliant the detailed feedback is in the form of the link channel matrix H. If the receiving station is IEEE 802.11ac compliant, the detailed feedback is in the form of the actual unitary beamsteering matrix V and the per tone diagonal matrix SNR. Any remaining stations targeted by the initial sounding, respond with the beamsteering matrix for their own link when asked to do so by the report poll 213. The next station 209 then responds with compressed detailed sounding feedback response packet 251B. Following the sounding, communications resume and downlink communication of user data is sent on the link(s) that have been sounded. Since each station 207, 208, 209 sends detailed sounding feedback reactively to each transmitter request, considerable bandwidth is consumed to maintain a large number of stations with frequent sounding sequences.

In response to each additional sounding packets 211 and 212, a beamformee 209 can send additional detailed beamforming feedback packets 251B, 252B, etc. In some approaches, the beamformee 209 can send additional detailed beamforming feedback packets 251B, 252B, in response to each prompt (e.g., report poll 213).

The user data packet(s) 266 (e.g., media access control (MAC) Service Data Unit (MSDU) or Protocol Data Unit (MPDU)) are sent using precoding based on an associated beamforming matrix. Transmitter 202 resumes sending user data packets 266 on the link(s) that have been sounded. The time and overhead required to send the detailed sounding feedback response packets 250A and 251B consumes substantial processing and transmission resources.

FIG. 2C a Prior Art packet diagram of a transmitter packet with a preamble field that is used for channel estimation. FIG. 2C includes a packet 240 and the corresponding symbol interval (SI) required to transmit each field. The header includes a legacy portion containing the L-STF, L-LTF and L-SIG fields and a very high throughput portion containing the VHT-SIGA, VHT-STF, VHT-LTF and VHT-SIGB fields. The payload portion contains no user data. The legacy (L), long (LTF) and short (STF) training and signal (SIG) fields are compatible with stations supporting only the IEEE 802.11n or earlier standards. The remaining signal and training fields are intended for very high throughput (e.g., IEEE 802.11ac compliant devices). The VHT-SIGA field contains information on the MCS and number of streams of the sounding. The VHT-STF field is used for automatic gain control (AGC). The VHT-LTF field (e.g., the channel estimation), includes a long training sequence used for MIMO channel estimation by the receiver.

Figure 2D:
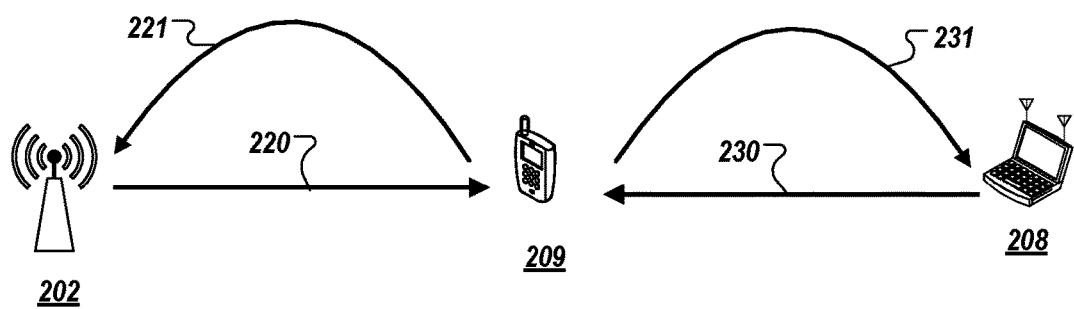

FIG. 2D is a diagram of sounding channels between an access point as transmitter 202 and one or more stations 208, 209. The access point and stations can be a transceiver including both a transmitter and a receiver that are combined and share common circuitry or a single housing. The access point and stations can also be a transmitter-receiver with separate circuitry between transmit and receive functions. A beamformer generally includes multiple antennas for a transmitter and a receiver while a beamformee may function with a single antenna or multiple antennas.

In an example where the access point transmitter 202 is the beamformer sounding beamformee station 209, the sounding channel can be described having both a forward channel 220 from the beamformer access point 202 to the beamformee station 209 and a reverse channel 221 from the beamformee station 209 to the beamformer access point 202. As shown in FIGS. 2A and 2B the beamformer access point 202 traditionally sends the pair of sounding packets with the NDPA announcement 211 and NDP sounding 212 via the forward channel 220 that is received by the beamformee station 209. The beamformee station 209 traditionally after processing the pair of sounding packets and then sends the detailed sounding feedback 250A, 250B, or 251B via the reverse channel 221.

Multiple stations 208, 209 can also sound each other for example as in a mesh network. In an example where the station 208 is the beamformer sounding beamformee station 209, the sounding channel can be described having both a forward channel 230 from the beamformer station 208 to the beamformee station 209 and a reverse channel 231 from the beamformee station 209 to the beamformer station 208. Thus, the beamformer station 208 sends the pair of sounding packets with the NDPA announcement 211 and NDP sounding 212 via the forward channel 230 that is received by the beamformee station 209. The beamformee station 209 traditionally, after processing the pair of sounding packets, then sends the detailed sounding feedback via the reverse channel 231.

Traditional explicit sounding requires the beamformer to send multiple packets to the beamformee, that then the beamformee must process each the multiple packets to generate detailed sounding feedback that are then returned when prompted. The multiple packets consume airtime of the forward channel 220 preventing the transmitter from using those communication resources for delivering actual user data to other stations. The detailed sounding feedback consumes significant processing cycles (e.g., 260), power of the beamformee, and bandwidth of the reverse channel 231. Regular sounding sequences with a beamformee stations that has limited resources can diminish the utility and usefulness of such station. Further, for networks with numerous stations, sounding with multiple packets and detailed sounding feedback wastes bandwidth and distracts the access point from effectively coordinating services for the growing demand of stations. Moreover, additional detailed sounding feedback packets are sent in response to receiving additional prompts from the beamformer.

Figure 3:
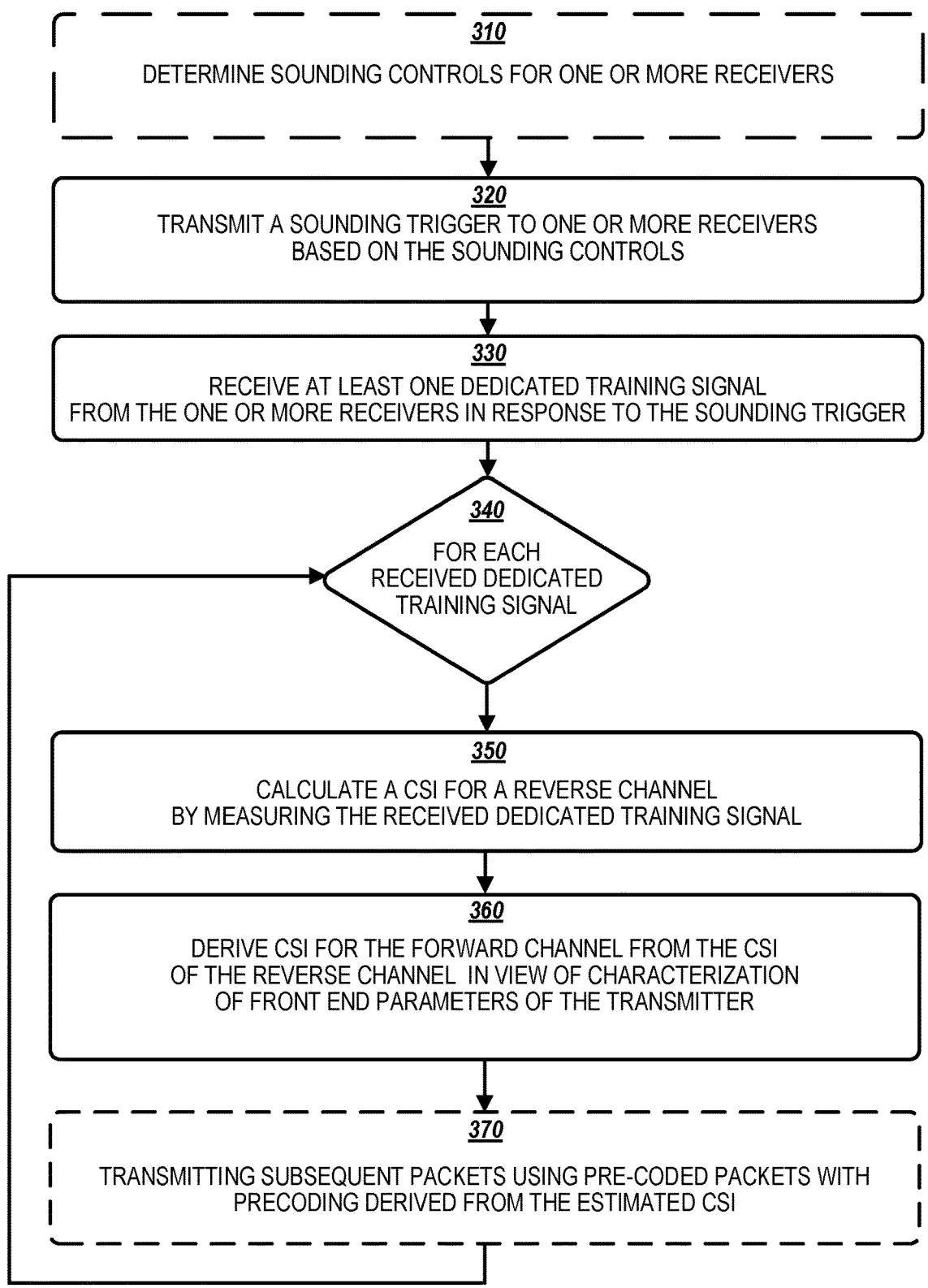
FIG. 3 illustrates a flow diagram of an example solicited sounding beamformer process in accordance with an example implementation.

FIG. 3 illustrates a flow diagram of an example solicited sounding beamformer process in accordance with an example implementation. The solicited sounding framework allows a beamformer to initiate the solicited sounding process in a coordinated scheme for several beamformee stations with different capabilities and configurable sounding characteristics. The solicited sounding framework further coordinates the beamformee stations to automatically update the beamformer with information to accurately precode user data without requiring the beamformer to send repeated requests or prompts for the updates.

The beamformer process can start at step 310 to determine sounding controls for one or more beamformee(s). In an example implementation, sounding controls can include sounding schedule instructions, training options, and station information as discussed in reference to FIGS. 4-8. Since the solicited sounding framework is initially initiated by the beamformer, it can coordinate multiple soundings sequences among several beamformees and reduces the processing overhead for sounding required by beamformees. The solicited sounding framework provides improved transmission overhead for sounding and requires minimal processing resources by the beamformees.

The sounding schedule and the training options can be based on communication parameters, for example, a beamformee's capabilities (e.g., beamforming, MIMO, etc.), traffic type (e.g., web browsing, video streaming, video conferencing, etc.), or positioning parameters (e.g., movement, dwell time, etc.). In an example implementation, the sounding schedule enables the beamformer to instruct the beamformee to send multiple dedicated training signals at scheduled sounding intervals in a coordinate manner and avoids sending multiple sounding trigger requests. The beamformee receives the sounding trigger with sounding instructions and provides an initial dedicated training signal response that does not require a payload or significant processing by the beamformee. The beamformee can store the instructions and execute the schedule to provide additional dedicated training signals without needing to receive additional sounding triggers or prompts. For example, the beamformer can determine sounding controls to include a sounding schedule with a short time interval for a receiver that previously received video conferencing traffic data.

At 320, the beamformer process transmits a sounding trigger to one or more beamformees based on the sounding controls. For example, the single sounding trigger can be a null data packet polling frame that is not preceded by an announcement frame. Unlike traditional explicit sounding techniques, solicited sounding enables the beamformer to trigger repeated information based on a single sounding trigger rather than a NDPA and NDP.

At 330, the beamformer process receives at least one dedicated training signal from the one or more beamformees in response to the sounding trigger. In solicited sounding the beamformee does not measure channel information from the received sounding trigger. The one or more dedicated training signals sent by the beamformee are triggered by the sounding trigger, but dedicated training signal does not require measurements associated with the transmission of the sounding trigger. For example, the dedicated training signal can be a null data packet without a payload of sounding data.

At 340, for each received dedicated training signal, the beamformer process performs steps 350 and 360 to estimate a forward channel state information. At step 350, the beamformer process calculates a CSI for a reverse channel by measuring the received dedicated training signal. At 360, the beamformer process derives a CSI for the forward channel, from the CSI of the reverse channel in view of characterization of front end parameters of the transmitter. In an example implementation, the beamformer process can use the estimated forward CSI at 370 to transmit subsequent packets using precoded packets with precoding derived from the estimated CSI. The beamformer process repeats, at least steps 350 and 360 for each receive dedicated training signal. Accordingly, the solicited sounding framework requires less beamformee processing and less bandwidth than traditional sounding approaches.

Figure 4A:
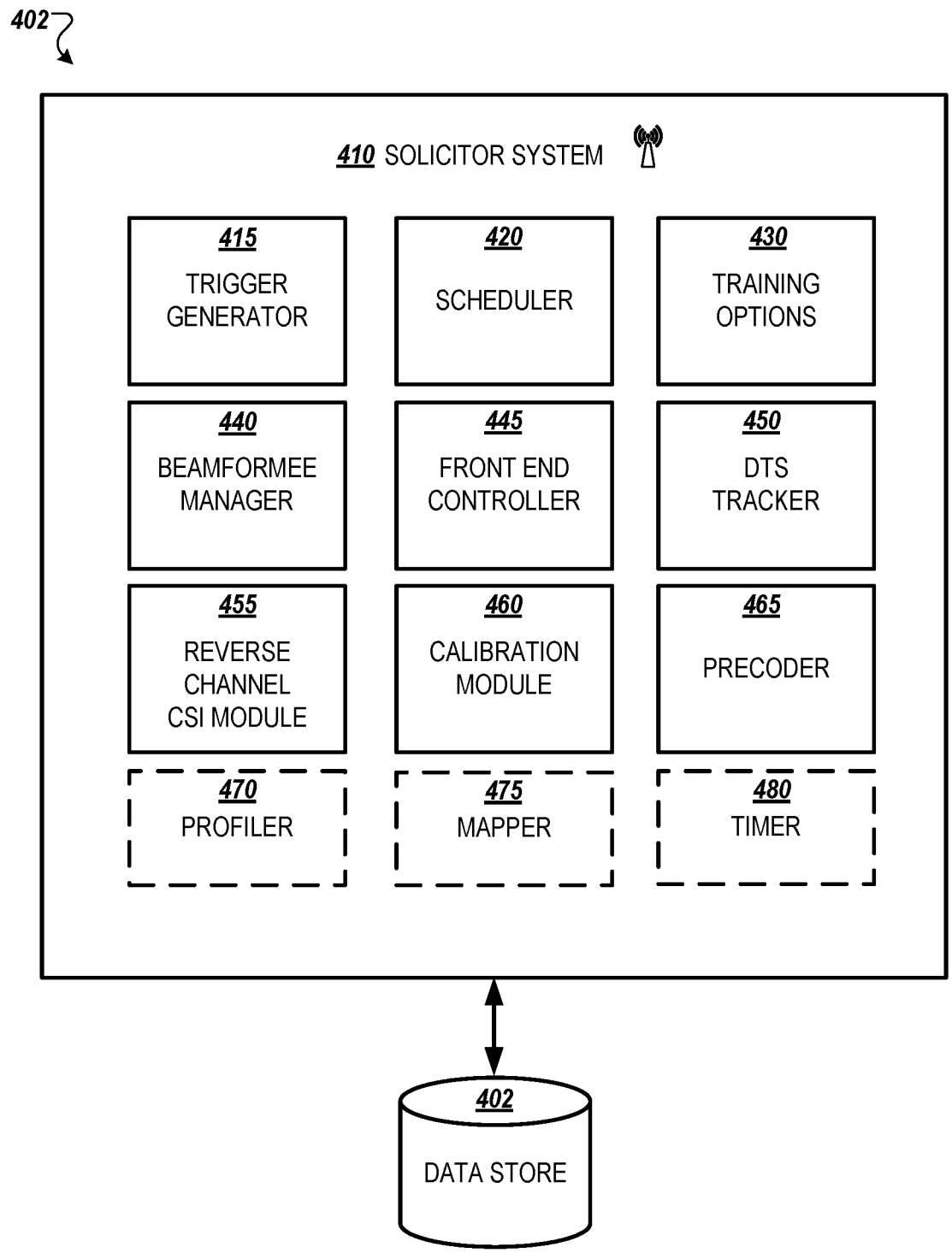
FIG. 4A illustrates a diagram of an example sounding solicitor system in accordance with an example implementation.

FIG. 4A illustrates a diagram of an example sounding solicitor system in accordance with an example implementation. The solicitor system 410 includes a trigger generator 415, a scheduler 420, a training options module 430, and a beamformee manager 440 for transmitting a sounding trigger to one or more beamformee. In an example implementation, the trigger generator 415 can create a sounding trigger that includes sounding controls such as sounding schedule instructions, training options, and station information for the one or more receivers. For example, training options for the beamformee to format the dedicated training signal can include repeated symbols, partial bandwidth, a number of bits, etc.

The trigger generator 415 uses the beamformee manager 440 to determine station information for a sounding trigger including a list of receivers to respond to the sounding trigger. The beamformee manager 440 can determine characteristics of stations that are to receive a sounding trigger from the transmitter. In some examples, the stations may be associated with the transmitter such that a successful handshake or authentication process has been attempted or successfully completed. The beamformee manager 440 can also deduce characteristics or assign identifiers to stations unassociated or authenticated with the transmitter. In some implementations, the beamformee manager 440 uses a data store 402 or a profiler module 470 to track or predict characteristics of stations. For example, the beamformee manager 440 can determine a station identifier (ID), capabilities of a station, a station type, a traffic/service type, location information, a predicted dwell time, etc. Further, the beamformee manager 440 can use captured MAC address information to determine or assign an identifier to a station. Using the beamformee manager 440, trigger generator 415 can include instructions in the sounding trigger that are targeted for different receivers.

In an example implementation, the trigger generator 415 can include different scheduling instructions in the sounding trigger that are targeted for different receivers. The beamformee manager 440 performs functions for coordinating and updating operations of the other modules of the solicitor system 410. For example, the beamformee manager 440 works with the scheduler 420 to generate a list of one or more receivers associated with a sounding trigger.

The scheduler 420 can generate scheduling instructions for individual targeted receivers or groups of receivers to provide dedicated training signals in a coordinated matter. For example, the scheduler 420 can generate scheduling instructions for different receivers to respond simultaneously in response a sounding trigger at different spatial streams. The solicitor system 410 can create various scheduling configurations as further discussed in reference to FIG. 5 herein.

In an example implementation, the trigger generator 415 can include scheduling instructions in the sounding trigger for groups of receivers and/or allow receivers in a group to determine a coordinated response time or interval. The beamformee manager 440 can identify groups of receivers and the scheduler 420 generates sounding instructions for the group in accordance with the beamformer process discussed in reference to FIGS. 3-5 herein.

In an example implementation, the trigger generator 415 can include training options in the sounding trigger for formatting the dedicated training signal by the one or more receivers. The beamformee manager 440 can operate with the training options module 430 to generate instructions for different receivers to respond to a sounding trigger with a dedicated training signal in a specific format or communication means (e.g., repeated symbol, spatial stream, partial bandwidth, a number of bits, etc.). The training options module 430 can also configure a set of training options in the sounding trigger based on characteristics of the transmitter, observed network behaviors or performance, environmental factors, feedback quality, etc.

The trigger generator 415 generates a sounding trigger for one or more receivers to solicit dedicated training signals with minimal overhead. In response to a single sounding trigger, the solicitor system 410 can receive multiple dedicated training signals from a single receiver and/or multiple different receivers.

The solicitor system 410 includes a front end controller 445, a dedicated training signals tracker module 450, a reverse channel CSI module 455, a calibration module 460, and a precoder 465 to process received dedicated training signals.

The front end controller 445 and the dedicated training signals tracker module 450 can operate with the beamformee manager 440 for handling multiple dedicated training signals received simultaneously. For example, the front end controller 445 can receive multiple dedicated training signals simultaneously at different spatial streams, the dedicated training signals tracker module 450 can queue the received dedicated training signals and associate them with a station profile or station information based on information from the beamformee manager 440.

The dedicated training signals tracker module 450 processes the received dedicated training signals with to measure channel information from each dedicated training signal, and the reverse channel CSI module 455 calculate CSI of the reverse channel from the measured dedicated training signal information. The calibration module 460 derives forward CSI for the forward channel from the reverse channel CSI utilizing the characteristics of the transmitter from the front end controller 445. Characteristics of the transmitter from the front end controller 445 can be based on specific hardware or software configurations of the transmitter such as manufacturing process variances, design parameters, transmit times or delays in RF hardware and band to antenna, delay difference between multiple chains of transmission, etc. The precoder 465 then uses precoding derived from the forward CSI for subsequent transmissions to the associated receiver via a forward channel.

Example implementations of the solicitor system 410 can also include a profiler 470, a mapper 475, and a timer module 480. The profiler 470 can track traffic with each station to generate historical information for predicting optimal configurations for sounding triggers. For example, based on a station's historical usage schedule or movement, the profiler 470 can indicate to the scheduler 420 an optimal time interval for scheduling repeated dedicated training signals in response to a single sounding trigger.

The mapper 475 can optimize sounding communications with stations of different capabilities. For example, the mapper 475 can coordinate with the front end controller 445 to receive dedicated training signals from multi-user MIMO (MU-MIMO) capable receivers, beamforming receivers, etc. The timer 480 support ranging operations with minimal overhead by leveraging the solicited sounding trigger and dedicated training signal responses. For example, the timer 480 can be used with training options module 430 to solicit a timestamp feedback with the dedicated training signal from a receiver to perform ranging operations to avoid or reduce additional triggers or request by the transmitter.

Figure 4B:
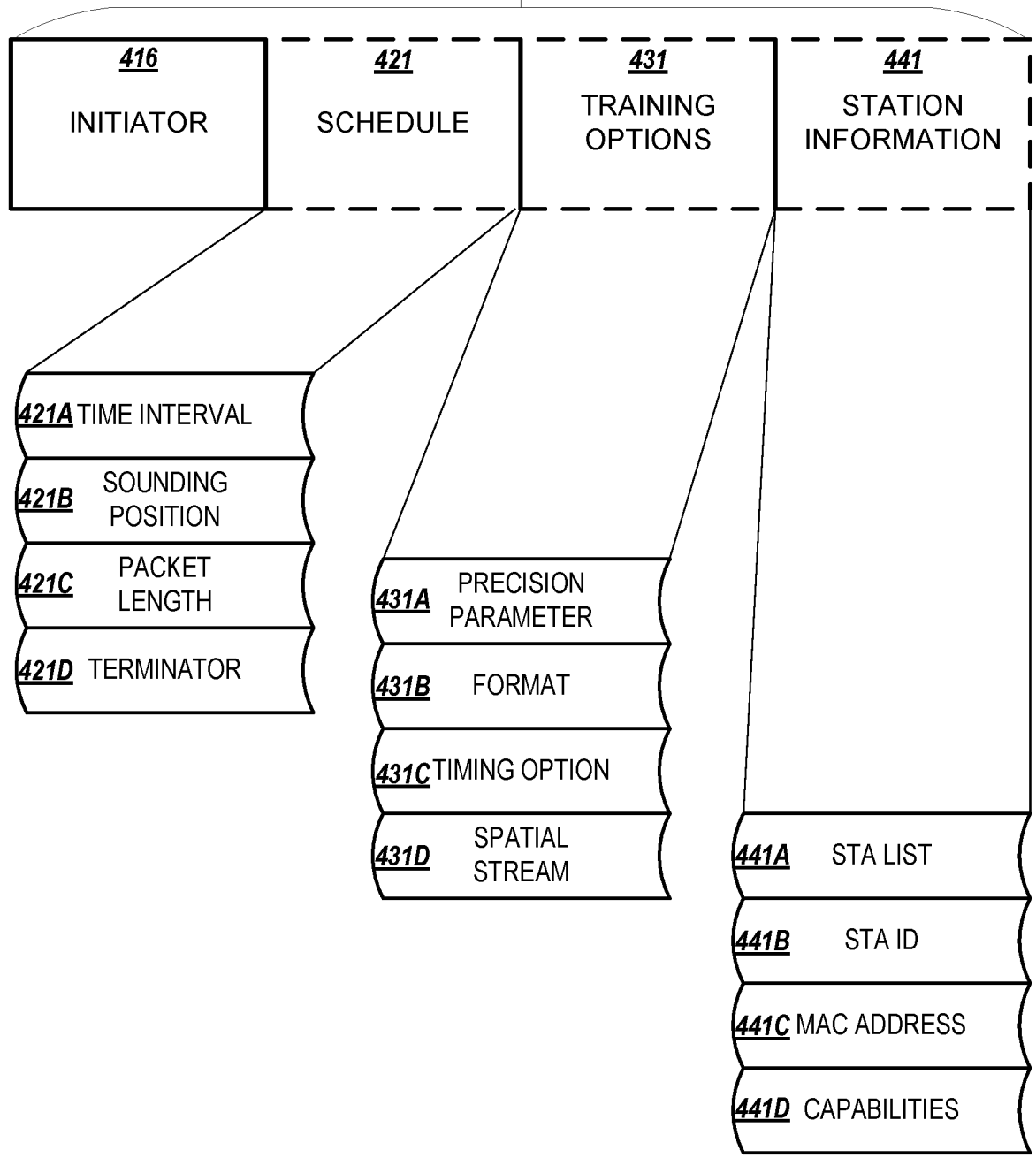
FIG. 4B illustrates a diagram of an example sounding trigger frame in accordance with an example implementation.

FIG. 4B illustrates a diagram of an example sounding trigger frame in accordance with an example implementation. The example sounding trigger 411 includes an initiator 416 that is a preamble to indicate for the receiver to respond with a dedicated training signal. The sounding trigger 411 is an individual frame that is transmitted and includes at least the preamble initiator 416 without any announcement packet. That is, the sounding trigger 411 is not part of a pair of packets or preceded by an announcement packet (e.g., a NDPA packet).

The sounding trigger 411 can include schedule information 421 created by scheduler 420 that, for example, allow for repeated responses to a single sounding trigger 411. Types of schedule information 421 can include a time interval 421A, a sounding position 421B, a packet length 421C, a terminator 421D, etc.

The time interval 421A of the schedule 421 indicates how often the beamformee is to send dedicated training signals after receiving a single sounding trigger 411. The solicitor system 410 can configure a time interval 421A to be static or dynamic based on time periods, network conditions, etc. for different beamformees receiving the single sounding trigger 411. For example, a static time interval 421A of the schedule 421 can instruct the beamformee to repeat sending dedicated training signals consistently according to a time frame (e.g., every 100 microseconds). A dynamic time interval 421A of the schedule 421 can instruct the beamformee to repeat sending dedicated training signals in bursts within a time frame or intermittently according to a timing factor, a condition, particular channel activity, etc.

The sounding position 421B can be used to indicate when the beamformee is to send a dedicated training signal according to a relative position or defined position. The sounding position 421B for the beamformee to send a dedicated training signal can be relative (e.g., an order, a location, a rank, a group, a time slot, etc.) to one or more other beamformees responding to the sounding trigger 411. For example, the sounding trigger 411 can be sent to a list of beamformees and the sounding position 421B indicates a sequence for each of the beamformees in the list to transmit a dedicated training signal. The beamformees can repeat sending dedicated training signals by restarting the sequence without receiving another sounding trigger 411. In another example, the sounding position 421B indicates coordinated time positions (e.g., based on a time scale, a reference time, etc.) for each of the beamformees to repeat sending dedicated training signals in groups or at different times without receiving another sounding trigger 411.

In some implementations, the sounding position 421B indicates for beamformee to repeat sending dedicated training signals by listening to a channel in view of the packet length 421C of the sounding trigger 411. For example, the beamformee can monitor the channel for a preamble from another beamformee or count the number transmissions heard from other beamformees, determine a preceding beamformee based on the sounding position 421B, and calculate a time to transmit after the preceding beamformee in view of the packet length 421C.

The schedule 421 can include a terminator 421D to indicate or signal for one or more of the beamformees to stop or suspend sending additional dedicated training signals. In some implementations, the terminator 421D is sent with a first sounding trigger 411 to indicate when one or more of the beamformees are to stop or suspend sending dedicated training signals. For example, the terminator 421D can indicate a number of dedicated training signals to send without receiving another sounding trigger. The terminator 421D can also indicate to suspend sending dedicated training signals after a period of time or condition (e.g., a schedule expiration). Other implementations can include a second sounding trigger 411 with the terminator 421D that signals to stop or suspend sending dedicated training signals. The sounding trigger 411 can include a terminator 421D for each targeted beamformee, a subgroup of targeted beamformees, or all responding beamformees. In another example, the sounding trigger 411 can include training options 431 configured by training options module 430 to, for example, instruct receivers how to format or customize the dedicated training signal. Types of training options 431 can include precision parameters 431A, format 431B, a timing option 431C, spatial stream 431D, etc.

For example, precision parameters 431A can indicate how often to repeat symbols in the VHT-LTF for the purposes of averaging at the receiver. In an example, a timing option 431C can indicate a measured time of arrival of an incoming packet and measured time of departure of an outgoing packet. Training options 431 can include spatial stream 431D configurations for use with MU-MIMO capable receivers. Other examples training options 431 can include configurable format 431B elements as understood in the art.

The sounding trigger 411 can also include station information 441 coordinated by the beamformee manager 440 to enable, for example, multiple receivers to respond to a single sounding trigger 411. Types of station information 441 can include a station list 441A, a station identifier 441B, a MAC address 441C, a station capability 441D, etc.

Example implementations of solicited sounding as described herein can use the sounding trigger 411 containing the initiator 416 and additionally including none, some, or all of the schedule information 421, training options 431, and/or station information 441 discussed herein.

Figure 5A:
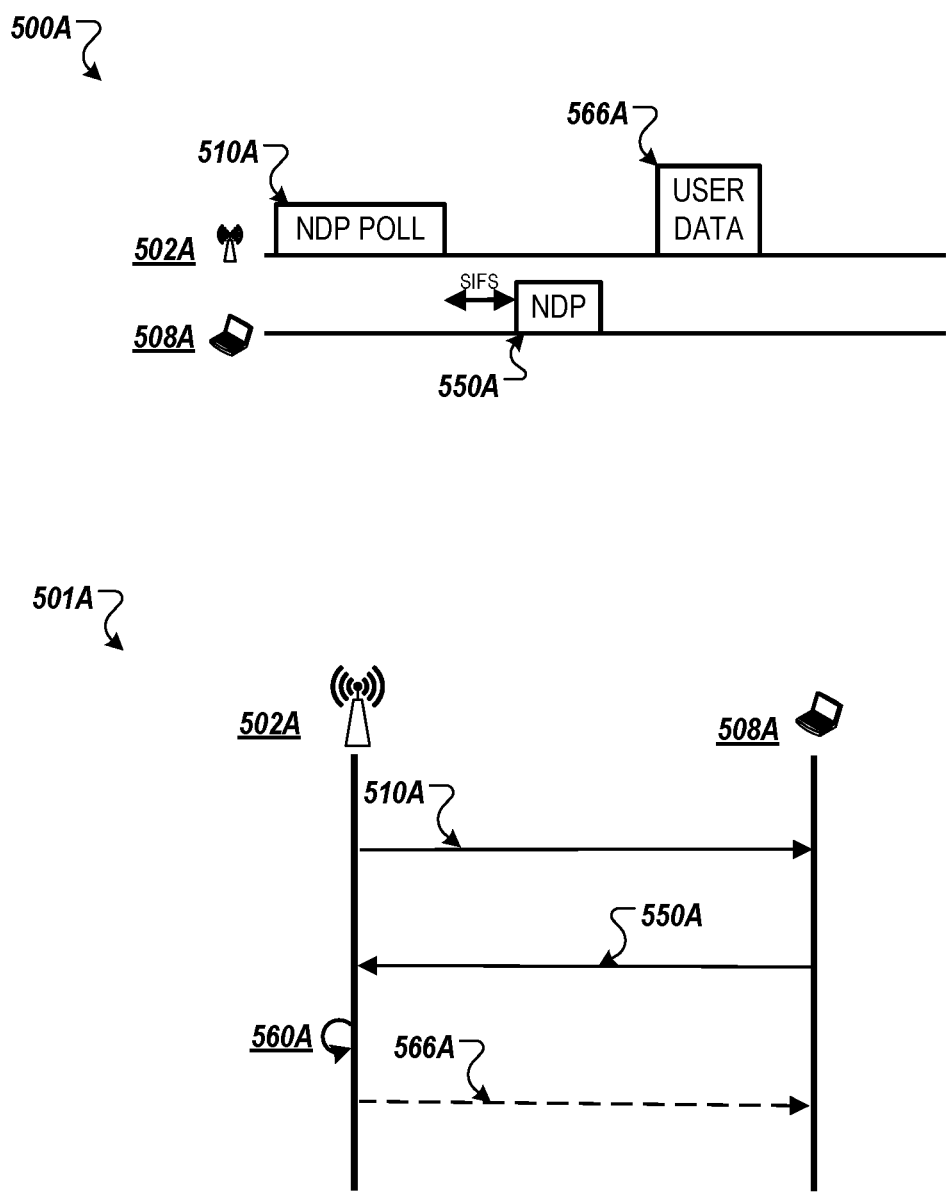

FIGS. 5A-5G illustrate example sequences of solicited sounding in accordance with various example implementations. FIG. 5A illustrates an example sequences 500A and 501A of solicited sounding for a targeted station 508A. The solicited sounding process may be initiated by an access point 502A to sound a channel for communicating with a station 508A. In the example implementation illustrate in 500A and 501A of FIG. 5A, the access point 502A initiates the solicited sounding by sending an NDP Poll 510A as a sounding trigger that identifies the access point 502A and the target recipient station(s) 508A.

In response receiving the NDP Poll 510A, the station 508A sends an NDP 550A to the access point 502A. The NDP 550A is sent within a first interval (e.g., a Short Interframe Space (SIFS) or fraction of a SIFS) of the NDP Poll 510A. The access point 502A reserves the channel during a predetermined response period for receiving the dedicated training signal. This NDP 550A response packet is an example dedicated training signal with no user data that can be processed to estimate reverse channel information in the reverse direction from the station 508A to the access point 502A. The access point 502A uses the reverse channel information derived based on the NDP 550A to estimate the forward CSI to determine the corresponding link matrix(s) used to adjust the forward channel precoding for subsequent MIMO transmissions (e.g., user data 566A) by the access point 502A to the target station 508A.

FIG. 5B illustrates an example sequences 500B, 501B and 503B of solicited sounding burst in accordance with various example implementations. In an example implementation, a solicited sounding can include separate sounding triggers NDP Poll 510B to solicit one or more dedicated training signals (e.g., NDP 550B, 551B, 552B) from a single station 508B as illustrated in sequences 500B and 501B of FIG. 5B. The beamformer can send additional NDP Poll 511B to update (e.g., add, change, modify, cancel, etc.) instructions for single station 508B indicated by the previous NDP Poll 510B.

The solicited sounding framework enables improved quality of data communications by instructing the beamformee to send multiple dedicated training signals over time without additional prompts so that the beamformer can use the multiple dedicated training signals to re-sound the link with updated CSI. Further, the beamformer can send another sounding trigger to maintain coordinated sounding sequences with the one or more beamformees to efficiently maintain communication links within the network. For example, the beamformer can send another sounding trigger to account for changes in transmission quality, network resources, performance of one or more of the beamformees. In an example, as data communications degrade the beamformer can send another sounding trigger to update a sounding interval or training signal format indicated by a previous sounding trigger.

In another example implementation, a solicited sounding burst can include separate sounding triggers NDP Poll 510B and 511B to solicit one or more dedicated training signals (e.g., NDP 550B, 551B, 552B) from different stations 508B, 509B as illustrated in sequences 500B and 503B of FIG. 5B. The sounding triggers NDP Poll 510B and 511B can be sent to one or more stations 508B, 509B in accordance with various example implementations. That is, NDP Poll 510B can be directed to a first station 508B and NDP Poll 511B can be directed to a second station 509B. In another example, NDP Poll 510B and NDP Poll 511B can be directed to both the first station 508B and the second station 509B. Further, NDP Poll 510B can be directed to a first station 508B and NDP Poll 511B can be directed to both the first station 508B and the second station 509B. Alternatively, NDP Poll 510B can be directed to both the first station 508B and the second station 509B and NDP Poll 511B can be sent to update sounding instructions for one of the stations (e.g., the first station 508B).

The solicited sounding process is initiated by the access point 502A to sound multiple different stations 508B, 509B with multiple sounding triggers NDP Poll 510B and 511B. In the example implementation illustrate by FIG. 5B, the access point 502B initiates the solicited sounding by sending a first NDP Poll 510B to a first station 508B and receives a first NDP 550B within a first interval for sounding of the first NDP Poll 510B. After receiving the first dedicated training signal from the first station 508B, the access point 502B can initiate another solicited sounding by sending a second NDP Poll 511B and receives a second NDP 551B from a second station 509B.

The first NDP Poll 510B and/or the second NDP Poll 511B can include a schedule for the respective station 508B and/or station 509B to send additional NDPs 552B responses without receiving additional NDP Polls. The access point 502B uses each received NDP 550B, NDP 551B, and NDP 552B to estimate forward CSI derived based on each NDP for sounding the associated station 508B or 509B. In another example implementation illustrate by FIG. 5B, a first NDP Poll 510B can be used to solicit one or more dedicated training signals from a targeted station 508B as an NDP 550B response. Based on the received NDP 550B, the access point 502B derives the forward CSI for the forward channel from the reverse channel CSI in view of characteristics of a radio frequency front end of the transmitter and subsequent packets are precoded with precoding derived from the forward CSI for transmission.

The NDP Poll 510B can include instructions for the targeted station 508B to send additional NDPs without an additional NDP Poll. The access point 502B can also send another NDP Poll 511B to the target station 508B to change (e.g., modify, replace, cancel, etc.) instructions indicated by a previous sounding trigger (e.g., first NDP Poll 510B). The second NDP Poll 511B can be can be used to update a parameter for soliciting one or more dedicated training signals indicated by a pervious NDP Poll 510B sent to one or more recipients.

Figure 5C:
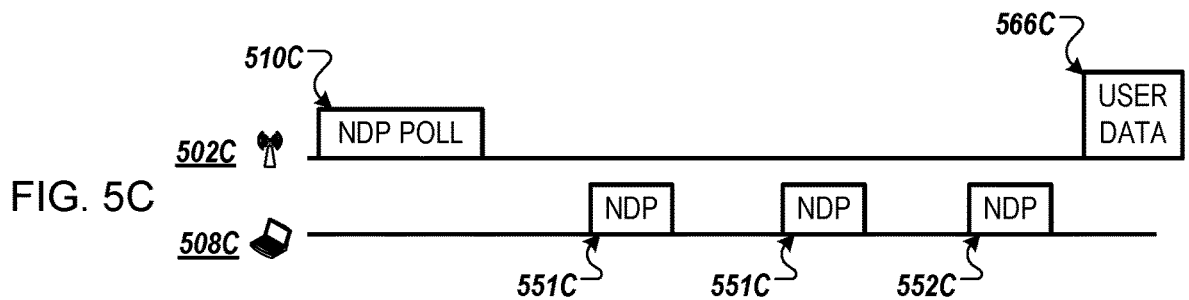

FIG. 5C illustrates an example sequence of solicited sounding for a series of dedicated training signal responses. In an example implementation, an NDP Poll 510C can include instructions for a targeted station 508C to send a series of NDPs 550C, 551C, 552C, without sending an additional NDP Poll.

In an example implementation illustrate by FIG. 5C, a first NDP 550C can be sent by the station 508C to the access point 502C as an initial response to the NDP Poll 510C from the access point 502C. The targeted station 508C can send additional dedicated training signals NDP 551C and NDP 552C based on instructions included in NDP Poll 510C. To receive the additional NDP 551C and NDP 552C, the access point 502C can maintain a timer to anticipate when to expect the additional dedicated training signals and reserve a channel.

For example, the NDP Poll 510C can include instructions that coordinate with the targeted station 508C when to expect a series of NDPs 550C, 551C, 552C at fixed or variable intervals, time window, based on satisfying a threshold condition, an external measuring resource, prediction, etc. Thus the access point 502C can receive the series of NDPs 550C, 551C, 552C based on a single NDP Poll 510C.

Figure 5D:
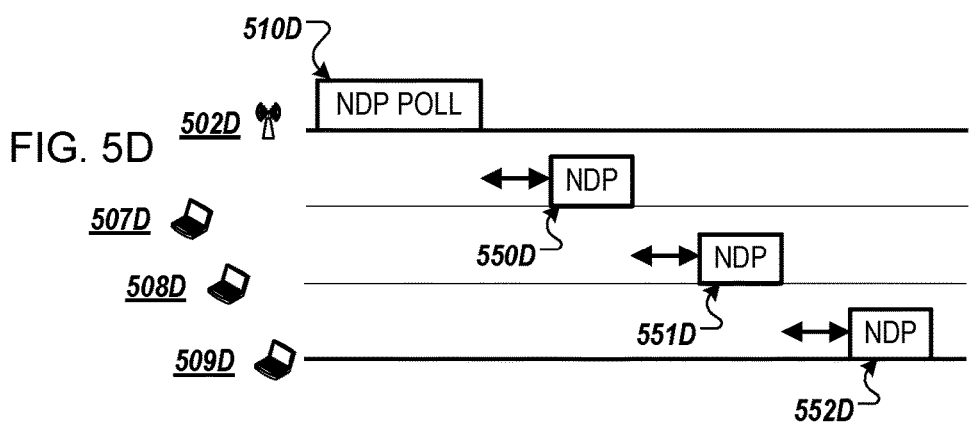

FIG. 5D illustrates an example sequences of solicited sounding for a series of dedicated training signal responses from one or more stations 550D, 551D, 552D. In an example implementation, an NDP Poll 510D can include instructions indicating a schedule for multiple different stations 507D, 508D, 509D to send multiple NDPs 550D, 551D, 552D without an additional NDP Poll. In the example implementation illustrate by FIG. 5D, the NDP Poll 510D can include a schedule to indicate a response interval, sounding position, etc. for each when of the stations 507D, 508D, 509D are to send NDPs 550D, 551D, 552D.

The NDP Poll 510D is a sounding trigger that identifies the access point 502 and the target recipient station(s) 508 for the solicited sounding. Where an NDP Poll 510D is sent to more than one station, the stations 507D, 508D, 509D can use the order in which the recipient stations are listed in the instructions from the sounding trigger 510D to control an order or position for sending NDPs 550D, 551D, 552D. For example, the NDP Poll 510D can include a list with the order or sounding position of each of the stations 507D, 508D, 509D. The stations 507D, 508D, 509D can repeat sending NDPs 550D, 551D, 552D to the access point 502D according to the order or schedule until the schedule expires, a termination command is sent, a new NDP Poll is received, or the station 507D goes offline.

For example, scheduling instructions indicated by the NDP Poll 510D can assign stations 507D to send a first NDP 550D within a SIFS relative to the NDP Poll 510D, stations 508D to send another NDP 551D within a SIFS relative to the first NDP 550D, and stations 509D to send a third NDP 552D within a SIFS relative to the second NDP 551D.

In another example implementation, the NDP Poll 510D can initiate multiple different stations 507D, 508D, 509D to send a multiple NDPs 550D, 551D, 552D without an additional NDP Poll where the different stations 507D, 508D, 509D determine when to send the each of the NDPs 550D, 551D, 552D. For example, NDP Poll 510D can be received by multiple different stations 507D, 508D, 509D and each station can monitor a network channel for a preamble of other dedicated training signals from other receivers responding to the sounding trigger.

In this example, station 507D can start responding to NDP Poll 510D with NDP 550D, and station 508D can monitor the network channel and listen for a preamble of NDP 550D. The station 508D can calculate a packet length of the NDP 550D from listening to the preamble of NDP 550D. Based on the packet length, station 508D can determine when the channel will be available next for transmitting the access point 502D and then transmit an NDPs 551D when the channel is available.

In another example, station 507D and station 508D can contend for the medium prior to sending the NDPs. For example, station 507D and station 508D each can attempt to transmit, detect the channel is busy, and wait an amount of time (e.g., a contention window) before attempting to transmit again. In response to a first station 508D detecting the channel is available, NDP 551D is transmitted while station 507D waits another amount of time before attempting to transmit. Then after another amount of time, if the second station 507D detects the channel is available, NDP 550D is transmitted.

As described above, the NDPs 550D, 551D, 552D response packets are dedicated training signals with no user data that can be processed to estimate reverse channel information in the direction from each of the stations 507D, 508D, 509D, to the access point 502D. Then for each received NDPs 550D, 551D, 552D, the access point 502D estimates forward CSI derived based on the respective NDP to determine the corresponding link matrix(s) required to adjust the forward channel precoding for subsequent MIMO transmissions (e.g., user data 566) by the access point 502 to the associated target station.

Figure 5E:
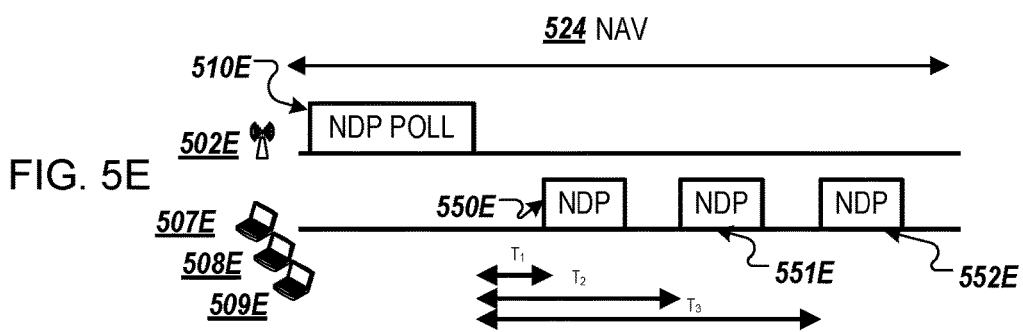

FIG. 5E illustrates an example sequences of solicited sounding with a variable response schedule. The access point 502E can send an NDP Poll 510 to multiple different stations 507E, 508E, 509E, or groups of stations and received multiple NDPs (E.g., 550E, 551E, 552E) within a response window (e.g., network allocation vector (NAV) 524).

The access point 502E can establish the response window coordinate with stations responding to the sounding trigger to transmit and block non-responding stations from attempting to transmit on the channel. For example, the NAV 524 provides a virtual carrier-sensing mechanism to control network access by signaling stations on the network that the channel is unavailable or busy for a specified contention period. The stations that are not responding to NDP Poll 510E listen on the wireless medium and use a duration field and set their NAV to indicate on how long it must defer from accessing the medium.

The responding stations 507E, 508E, 509E can respond at different times (e.g., $T_1$, $T_2$, $T_3$, etc.) based on schedule instruction of the NDP Poll 510E. The solicited sounding framework supports a variety of scheduling schemes as described herein. For example, the NDP Poll 510E can indicate a sounding position relative to other receiver stations, and each station 507E, 508E, 509E can determine one or more response times based on the sounding position to transmit the one or more dedicated training signals at the calculated response times. In another example, stations 507E, 508E, 509E can coordinate sending multiple NDPs 550E, 551E, 552E sequentially by determining a response time based on a packet length of the NDP. Each station 507E, 508E, 509E can monitor the channel listen for a preamble of an NDP from another one of the stations to determine the packet length of the NDPs. From the determined the packet length of the NDPs, a second station 508E can calculate a response time T2 from a reference time such as the last detected NDP preamble.

Figure 5F:
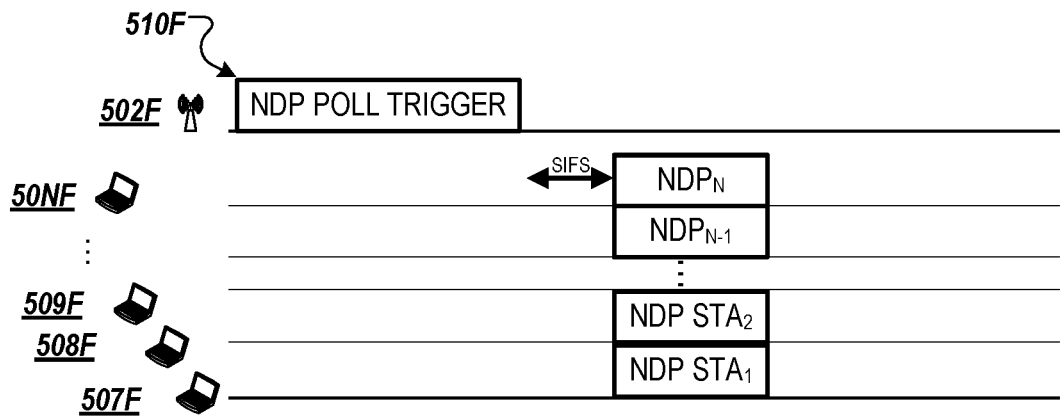

FIG. 5F illustrates example sequences of solicited sounding with Uplink MU-MIMO communication. An access point with front end RF capable parameters for uplink MU-MIMO communication breaks-up available bandwidth into separate individual streams (i.e., spatial streams) that share the medium equally. With uplink MU-MIMO, an access point can receive distinct data from two or more stations concurrently over a same set of OFDM tones. An MU-MIMO access point is characterized by front end parameters (e.g., a number of transmit and receive chains, antenna, etc.) of the transmitter where the capacity to transmit and receive up to n×m communications streams per link of an antenna array.

In an example implementation, an NDP Poll Trigger 510F can solicit multiple MU-MIMO capable stations 506F, 507F, 508F, 509F to simultaneously send NDPs (e.g., NDP $STA_1$, NDP $STA_2$, ..., $NDP_{N-1}$, $NDP_N$) on sperate spatial streams to a MU-MIMO capable access point 502F. The NDP Poll Trigger 510F can indicate or assign a targeted spatial stream for each station 506F, 507F, 508F, 509F to transmit a respective NDPs (e.g., NDP $STA_1$, NDP $STA_2$, ..., $NDP_{N-1}$, $NDP_N$) so each of responses is received by the access point 502F at the same time. The NDP Poll Trigger 510F can also be used by the stations 506F, 507F, 508F, 509F as a time reference point to coordinate the simultaneous transmission of the multiple NDPs (e.g., NDP $STA_1$, NDP $STA_2$, ..., $NDP_{N-1}$, $NDP_N$) on different spatial streams so that the MU-MIMO capable access point 502F can properly process the NDPs (e.g., NDP $STA_1$, NDP $STA_2$, ..., $NDP_{N-1}$, $NDP_N$) to estimate forward channel information.

In an example implementation illustrate by FIG. 5F, a first NDP $STA_1$ can be sent by the station 506F on a first spatial stream, a second NDP $STA_2$ can be sent by the station 507F on a second spatial stream, ..., $NDP_{N-1}$ can be sent by a station 508F on spatial stream N–1, $NDP_N$ can be sent by a station 509F on spatial stream N, and up to the number of available spatial streams indicated by the access point 502F.

Figure 5G:
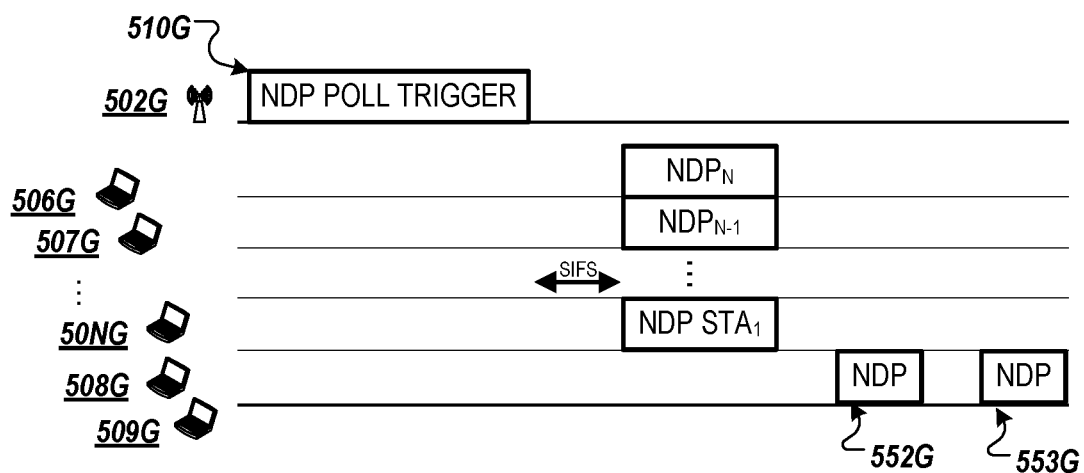

FIG. 5G illustrates an example sequences of solicited sounding with different types of stations. In an example implementation illustrated by FIG. 5G, an NDP Poll 510G can solicit multiple different stations that grouped to send dedicated training signals. In one example, different stations (e.g., 506G-SONG) can be grouped based on their capabilities and scheduled to send NDPs at different times.

For example, the NDP Poll 510G can instruct a first group of MU-MIMO capable stations 506G to SONG to simultaneously send NDPs NDPs (e.g., NDP $STA_1$, NDP $STA_2$, ..., $NDP_{N-1}$, $NDP_N$) on separate spatial streams within a first response interval, and further instruct a second group of beamforming capable stations 508G and 509G to sequentially send NDPs 552G, 553G after the response interval. Example implementations can include combinations of different scheduling and training options as discussed herein.

Figure 6:
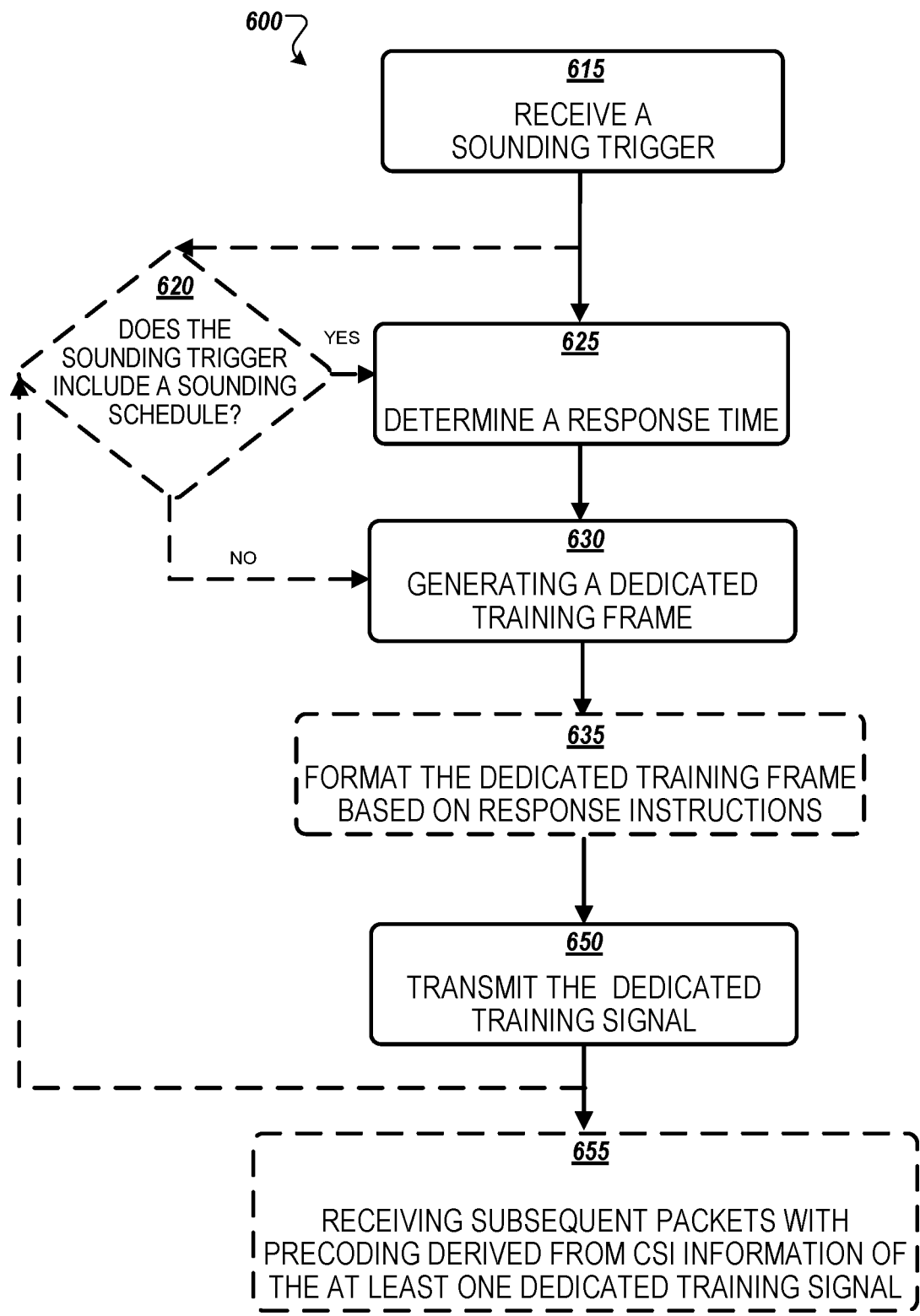
FIG. 6 illustrates a flow diagram of an example solicited sounding beamformee process in accordance with an example implementation.

FIG. 6 illustrates a flow diagram of an example solicited sounding beamformee process in accordance with an example implementation. Solicited sounding process 600 for the beamformee can include receiving a sounding trigger at 615 from a wireless transmitter and transmitting at least one dedicated training signal in response to the sounding trigger 650. In an example, the beamformee receives subsequent packets with precoding derived from CSI information of the at least one dedicated training signal at 655.

In an example implementation, at 625 the beamformee determines a response time for transmitting. The beamformee can process a single sounding trigger to provide multiple dedicated training signals that are used to determine precoding for subsequent packets sent via the forward channel from the transmitter. The beamformee can determine the response time for transmitting without a sounding schedule by, for example, immediately responding, using contention based transmission, recalling a schedule from memory, monitoring the channel for information from other stations, etc.

The beamformee can also process the sounding trigger to set a scheduler for providing additional dedicated training signals and configure the dedicated training signals at 620. In an example implementation, the wireless receiver receives the sounding trigger at 615 that indicates a sounding schedule at 625 and training options for a format of the dedicated training signal. The beamformee stores the sounding schedule and calculates a response time for each of the one or more dedicated training signals based on the sounding schedule.

In an example implementation, the at least one dedicated training signal from the one or more beamformees includes multiple dedicated training signals from an associated beamformee in response to the sounding trigger. The sounding trigger indicates a sounding schedule for additional dedicated training signals from the associated beamformee, and the multiple dedicated training signals from the associated beamformee are received at timed intervals based on the sounding schedule The beamformee can also format the dedicated training signals based on the training options from the sounding trigger at 635. In an example, the beamformee can determine a time to send a dedicated training signal by monitoring network traffic for a preamble of other dedicated training signals from other receivers responding to the sounding trigger. Then the beamformee can derive a packet length of the dedicated training signal based on the other dedicated training signals and determine a response time based on the packet length.

In another example, where the sounding trigger can indicate a sounding position relative to other receivers, the beamformee calculates one or more response times based on the sounding position and transmits the one or more dedicated training signals at the calculated response times.

Figure 7A:
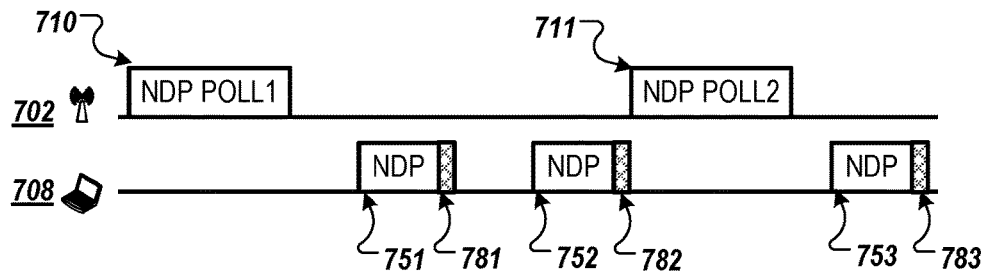
FIGS. 7A-B illustrate an example of solicited sounding with timing feedback in accordance with example implementations.
Figure 7B:
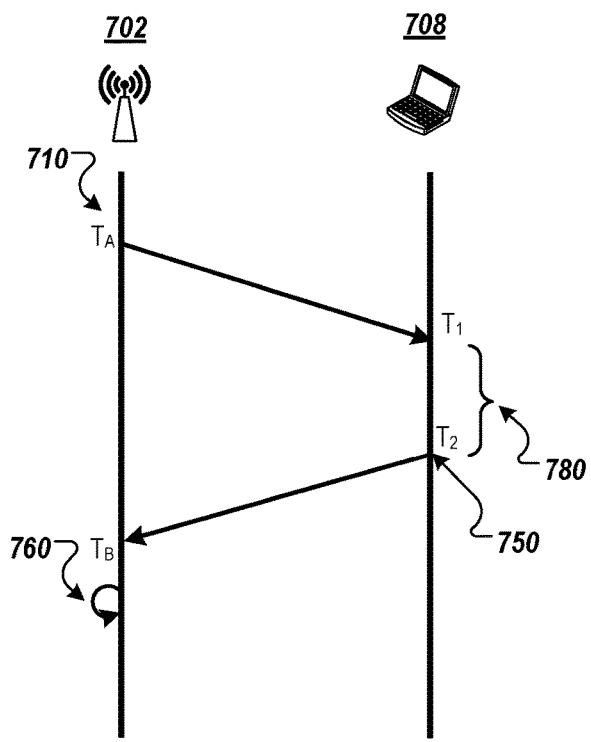

FIGS. 7A-B illustrate an example of solicited sounding with timing feedback in accordance with example implementations. In other example implementations, the beamformee can adapt the solicited sounding framework for streamlining or supporting other networking applications (e.g., motion tracking, building automation, etc.) in addition to sounding. In an example, the beamformee can determine timing feedback based on measured time of arrive of the incoming packet and measured time of departure of the outgoing packet. Then the beamformee can transmit a timestamp or other timing information with at least one of the dedicated training signals. Including additional timing feedback with the dedicated training signal can efficiently synchronize timing between stations, ranging functions, etc. with minimal increase to transmission overhead between the beamformee and beamformer.

FIG. 7A illustrates an example sequences of solicited sounding with timing feedback. In other example implementations, the stations 707, 708, 709 can adapt the solicited sounding framework for streamlining or supporting other networking applications (e.g., motion tracking, building automation, etc.) in addition to sounding. In an example, the stations 707, 708, 709 can determine additional feedback parameters 781, 782, 783 that is transmitted to the access point 702E with the NDPs 751, 752, 753. For example, stations 751, 752, 753 can determine timing feedback parameters 781, 782, 783 that are transmitted with the NDPs 751, 752, 753 that can be used by the access point 702 for other network applications or coordination such as efficiently synchronize timing between stations, ranging functions, etc.

The NDPs 751, 752, 753 do not include a payload or user data for solicited sounding purposes. However, additional feedback timing feedback parameters 781, 782, 783 can optionally be transmitted with NDPs 751, 752, 753 to streamline or support other networking applications (e.g., motion tracking, building automation, etc.) in addition to sounding. By transmitting additional feedback parameters 781, 782, 783 with NDPs 751, 752, 753, the access point 702 can initiate multiple functions with a single trigger. For example, the access point 702 can extract or determine timing information from data (e.g., additional feedback parameters 781, 782, 783) appended to the NDPs 751, 752, 753. The additional feedback parameters 781, 782, 783 are not required for and not used by the beamformer to complete the solicited sounding process. However, by operatively coupling the additional feedback parameters 781, 782, 783 appended to the NDPs 751, 752, 753, the number of overhead transmissions between a beamformer and beamformee can be further reduced.

FIG. 7B illustrates an example time sequences of solicited sounding with timing feedback. In an example implementation, the station 708 determining timing feedback 780 based on measured time of arrival of an incoming packet $T_1$ and measured time of departure T2 of an outgoing packet. In an example, the timing feedback 780 can be the difference in the times, one or more timestamps or other calculations. The station 708 can optionally include the timing feedback 780 as additional information 781 during a transmission of an NDP 751 when responding to a NDP Poll 710. By transmitting the timing feedback 780 as additional information 781 during a transmission of a NDP 751, the solicited sounding framework can be leveraged to eliminate or avoid a separate additional transmissions of timing feedback 780 to efficiently provide additional functionality. The beamformee can enable the access point 702 to process other applications 760 in addition to the solicited sounding from the single transmission from the station 708 thus increasing availability of the channel.

Figure 8A:
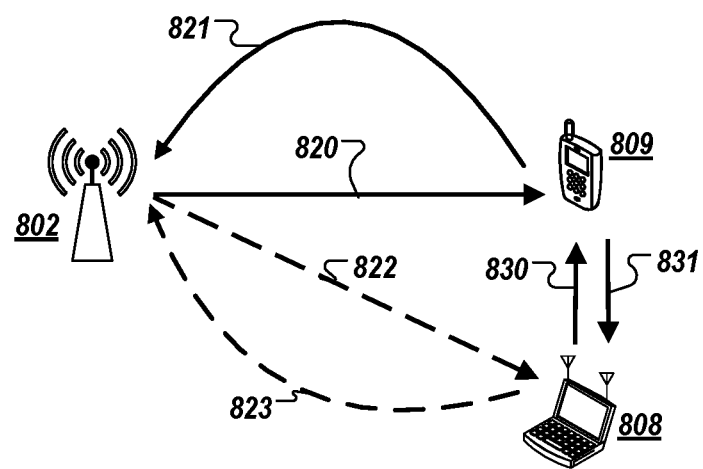
FIGS. 8A-C illustrate an example of sounding solicited by another beamformer in accordance with an example implementation.
Figure 8B:
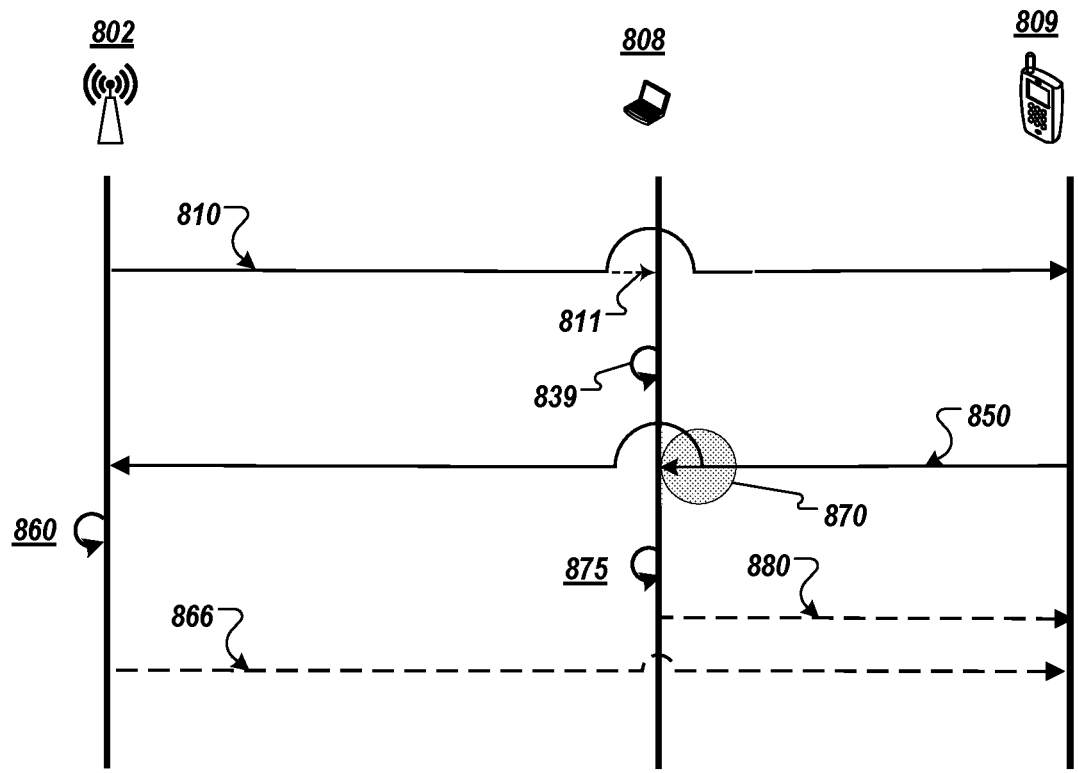
Figure 8C:
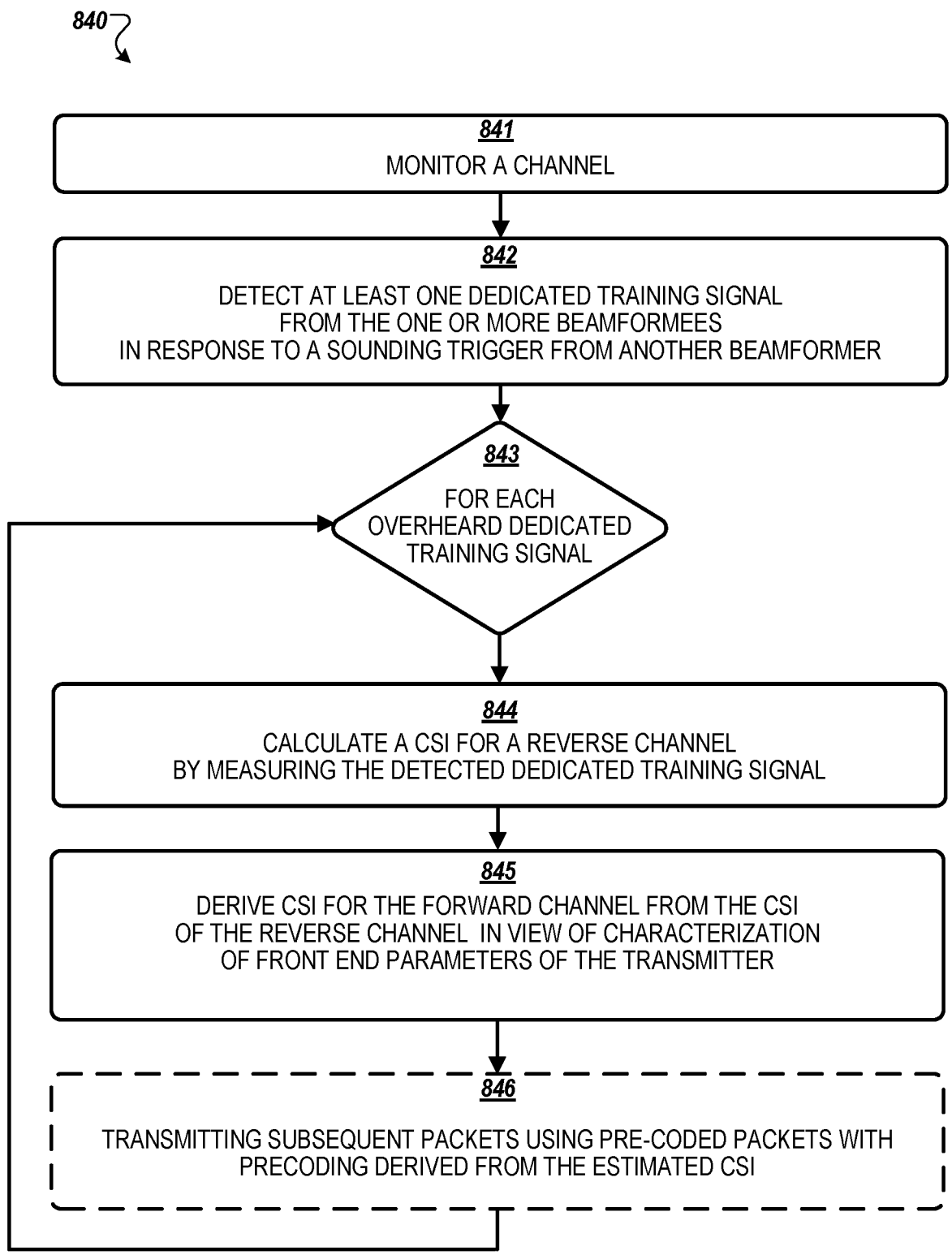

FIGS. 8A-C illustrate an example of sounding solicited by another beamformer in accordance with an example implementation. In an example implementation, solicited sounding by a first beamformer (e.g., access point 802) can enable one or more other beamformers (e.g., station 808) to estimate a forward channel 830 to the same station 809 without sending any sounding trigger.

FIG. 8A illustrates an example sequences of solicited sounding in accordance with an example implementation. In an example where the access point 802 is the beamformer sounding beamformee station 809, the access point to station (AP-STA) sounding channel can be described having both a AP-STA forward channel 820 from the beamformer access point 802 to the beamformee station 809 and an STA-AP reverse channel 821 from the beamformee station 809 to the beamformer access point 802. As discussed above, the beamformer access point 802 can send a single sounding trigger via the AP-STA forward channel 820 that is received by the beamformee station 809. The beamformee station 809 can send multiple dedicated training signals via the STA-AP reverse channel 821 in response to the single sounding trigger from the AP-STA forward channel 820 with minimal processing required.

In an example implementation, multiple beamformers can sound one or more beamformees based on a single solicited sounding trigger. Solicited sounding by a first beamformer (e.g., access point 802) can enable one or more other beamformers (e.g., station 808) to estimate a STA-STA forward channel 830 to the same station 809 without sending any sounding trigger. For example, the first beamformer access point 802 can send a sounding trigger via the AP-STA forward channel 820, the beamformee station 809 can respond with an NDP to the first beamformer access point 802 via the STA-AP reverse channel 821 that is overheard by the second beamformee station 808 via a STA-STA reverse channel 831.

In an example where the station 808 is a beamformer communicating with beamformee station 809, the sounding channel can be described having both a STA-STA forward channel 830 from the beamformer station 808 to the beamformee station 809 and a STA-STA reverse channel 831 from the beamformee station 809 to the beamformer station 808. For example as in a mesh network, the second station 808 can be a beamformee of the beamformer access point 802 and the second station 808 can be a beamformer of the beamformee station 809 among other combinations.

It should be noted that beamformers and beamformees as well as the channels are not limited to any number or combination of access points and stations. The examples described herein are exemplary and apply to any combinations communication devices with means for beamformers operations and/or means for beamformees operations.

In some implementation, the second station 808 can also receive the sounding trigger from the first beamformer (e.g., access point 802) via a second AP forward channel 822. In other implementation, the second station 808 can receive the dedicated training signal from the first station 809 independent of receiving the sounding trigger from the access point 802. The second station 808 can monitor a medium (e.g., via STA-STA reverse channel 831) for dedicated training signals from a beamformee station 809 to estimate a STA-STA forward channel 830 without sending a sounding trigger.

The beamformer station 808 can perform sounding for the STA-STA forward channel 830 based on overhearing the dedicated training signal via STA-STA reverse channel 831 that was sent by beamformee station 809 to access point 802 via AP reverse channel 821.

FIG. 8B illustrates an example sequence of multiple beamformers sounding beamformees based on a single solicited sounding trigger in accordance with an example implementation. At 810, access point 802 sends a sounding trigger, via the AP-STA forward channel 820, to the first station 809. At 811, the second station 808 may or may not also receive the same sounding trigger via another AP-STA forward channel 822.

At 836, the second station monitors a frequency of the STA-STA reverse channel 831 for dedicated training signals. Monitoring the frequency of STA-STA reverse channel 831 can detect transmission broadcast or sent on other sounding channels in the network (e.g., the AP-STA forward channel 820, the STA-AP reverse channel 821, the STA-STA reverse channel 831, another AP-STA forward channel 822, etc.). At 850, the first station 809 sends, via the AP reverse channel 821 one or more dedicated training signals to the access point 802 based on the sounding trigger. At 870, the second station 808 overhears, via the STA-STA reverse channel 831, the one or more dedicated training signals sent by the first station 809. At 875, the second station 808 processes the overheard dedicated training signals to estimate a forward CSI for STA-STA forward channel 830. At 880, the second station 808 can transmit subsequent packets, via STA-STA forward channel 830, to associated beamformee first station 809 based on the estimated forward CSI for the STA-STA forward channel 830.

At 860, the access point 802 processes the received dedicated training signals to estimate the forward CSI for the AP-STA forward channel 820. At 866, the access point 802 can transmit subsequent packets, via AP-STA forward channel 820, to associated beamformee first station 809 based on the estimated forward CSI for the AP-STA forward channel 820. Thus, multiple beamformers can sound one or more beamformees based on a single solicited sounding trigger.

FIG. 8C illustrates a flow diagram of an example sequences of a secondary beamformer sounding a beamformee based on a single solicited sounding trigger from a primary beamformee. The secondary beamformer process 840 starts at step 841 where a secondary beamformer (e.g., a non-soliciting beamformer, a piggybacking beamformer, etc.) is to monitor a communication medium as discussed in reference to FIGS. 8A-B.

At 842, the secondary beamformer process detects at least one dedicated training signal from one or more beamformees in response to a sounding trigger that was sent by another beamformer (e.g., a primary beamformer or solicitor beamformer). The secondary beamformer does not transmit a sounding trigger.

At 843, for each overhead dedicated training signal, the secondary beamformer process performs steps 844 and 845 to estimate a forward channel state information. At step 844, the secondary beamformer process calculates a CSI for a reverse channel by measuring the received dedicated training signal. At 845, the secondary beamformer process derives a CSI for the forward channel, from the CSI of the reverse channel in view of characterization of front end parameters of the transmitter.

In an example implementation, the secondary beamformer process can use the estimated forward CSI at 846 to transmit subsequent packets using precoded packets with precoding derived from the estimated CSI. The secondary beamformer process repeats, at least steps 844 and 845 for each overhead dedicated training signal associated with a beamformee that the secondary beamformer intends to communicate with. Accordingly, the solicited sounding framework requires less beamformer processing and less bandwidth than traditional sounding approaches.

Figure 9:
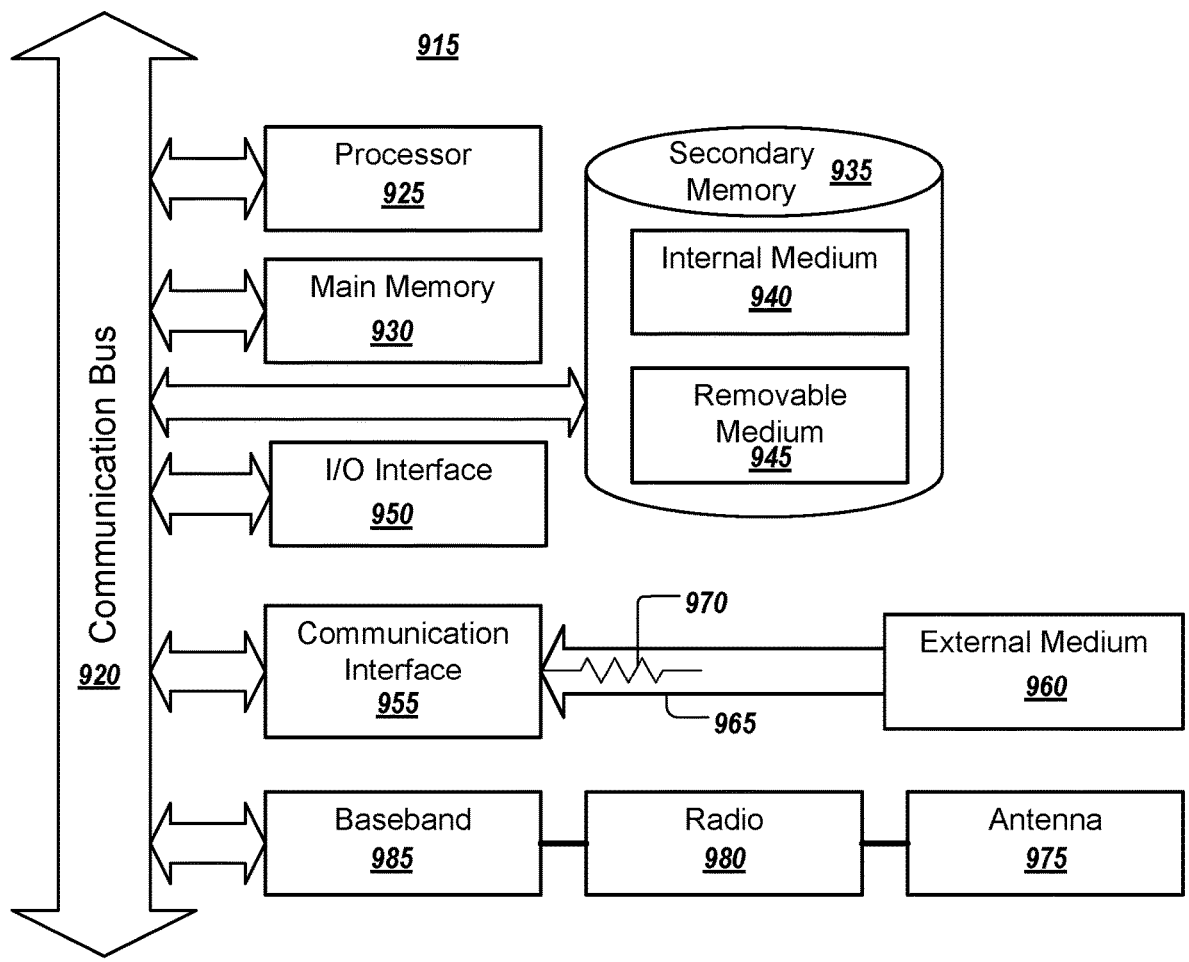
FIG. 9 illustrates a diagram of an example networking device in accordance with an example implementation.

FIG. 9 illustrates a diagram of an example networking device or system that may be used in connection with various example implementations described herein. For example the system 915 may be used as or in conjunction with one or more of the mechanisms or processes described above, and may represent components of processors, user system(s), and/or other devices described herein. The system 915 can be a networking device, a router, a server, a laptop, mobile device, or any conventional computer, or any other processor-enabled device that is capable of wired or wireless data communication. Other computer systems and/or architectures may be also used, as will be clear to those skilled in the art.

The system 915 preferably includes one or more processors, such as processor 925. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 925.

The processor 925 is preferably connected to a communication bus 920. The communication bus 920 may include a data channel for facilitating information transfer between storage and other peripheral components of the system 920. The communication bus 920 further may provide a set of signals used for communication with the processor 925, including a data bus, address bus, and control bus (not shown). The communication bus 920 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 802.11, IEEE 1188 general-purpose interface bus (GPIB), IEEE 696/S-30, and the like.

Processor(s) 925 can execute under any operating system (OS) (not shown), in a native or virtual environment. One or more applications can be deployed that include logic unit, application programming interface (API) unit or the like.

System 915 preferably includes a main memory 930 and may also include a secondary memory 935. The main memory 930 provides storage of instructions and data for programs executing on the processor 925, such as one or more of the functions and/or modules discussed above. It should be understood that programs stored in the memory and executed by processor 925 may be written and/or compiled according to any suitable language, including without limitation C/C++, Java, JavaScript, Pearl, Visual Basic, .NET, and the like. The main memory 930 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 935 may optionally include an internal memory 940 and/or a removable medium 945, for example a digital versatile disc (DVD) drive, other optical drive, a flash memory drive, etc. The removable medium 945 is read from and/or written to in a well-known manner. Removable storage medium 945 may be, for example, a floppy disk, magnetic tape, CD, DVD, SD card, etc. The removable storage medium 945 is a non-transitory computer-readable medium having stored thereon computer executable code (i.e., software) and/or data.

Other examples of secondary memory 935 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 945 and communication interface 955, which allow software and data to be transferred from an external medium 960 to the system 915.

System 915 may include a communication interface 955. The communication interface 955 allows software and data to be transferred between system 915 and external devices (e.g., printers), networks, or information sources. For example, computer software or executable code may be transferred to system 915 from a network server via communication interface 955. Examples of communication interface 955 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 915 with a network or another computing device.

Communication interface 955 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 955 are generally in the form of electrical communication signals 970. These signals 970 are preferably provided to communication interface 955 via a communication channel 965. In one example implementation, the communication channel 965 may be a wired or wireless network, or any variety of other communication links. Communication channel 965 carries signals 970 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 930 and/or the secondary memory 935. Computer programs can also be received via communication interface 955 and stored in the main memory 930 and/or the secondary memory 935. Such computer programs, when executed, enable the system 915 to perform the various functions of the present invention as previously described.

For example, communication interface 955 coupled to processor 925 can be configured to operate a wireless transceiver including transmitting a sounding trigger to one or more receivers, and receiving at least one dedicated training signal from the one or more receivers via a reverse channel in response to the sounding trigger. For each received dedicated training signal, it can estimate forward CSI derived based on the dedicated training signal from an associated receiver; and wherein subsequent packets are precoded with precoding derived from the forward CSI for transmission to the associated receiver via a forward channel.

According to an example implementation, the processor 925 can be configured to transmit additional sounding triggers to target additional receivers, where a separate additional dedicated training signal is received from each of the additional receivers in response to each additional sounding trigger, and where for each separate additional dedicated training signal received, the processor further estimates CSI for the additional receiver associated with the separate additional dedicated training signal; and transmits additional steering packets to the additional receiver based on the CSI. The sounding trigger is not preceded by an announcement frame and the receiver does not process the sounding trigger to generate detailed sounding feedback (e.g., a compress beamforming feedback based SVD).

In another example, communication interface 955 coupled to processor 925 can be configured to operate a wireless receiver including receiving a sounding trigger from a wireless transmitter, transmitting at least one dedicated training signal in response to the sounding trigger; and receiving subsequent packets with precoding derived from CSI information of the at least one dedicated training signal.

Transmitting at least one dedicated training signal in response to the sounding trigger can include transmitting multiple dedicated training signals without receiving another sounding trigger. In an example, the sounding trigger indicates a sounding schedule and training options for a format of the dedicated training signal, and the processor 925 is configured store the sounding schedule, calculate a response time for each of the one or more dedicated training signals based on the sounding schedule, and format the dedicated training signals based on the training options. The sounding schedule instructions can indicate sounding times to transmit a dedicated training signal coordinated with a group of receivers (e.g., sequentially, consecutively, simultaneously, in bursts, etc.). In other example implementations, the processor 925 is configured to determine the response time to transmit additional dedicated training signals without receive additional prompting by the beamformer. In the example, the wireless transceiver can transmit additional sounding triggers to target additional beamformees. For example, additional sounding triggers initiate a series of a separate additional dedicated training signal from each of the additional beamformees. Further, additional sounding triggers initiate a series of a separate additional dedicated training signal from each of the additional beamformees in response to each additional sounding trigger.

In an example, operating the wireless transceiver for estimating the forward CSI includes measuring channel information from the dedicated training signal received via the reverse channel, calculating a CSI for the reverse channel from the measured channel information, and deriving the forward CSI for the forward channel from the CSI for the reverse channel in view of characteristics of a radio frequency front end of the transceiver, wherein the subsequent packets are transmitted to the associated beamformee via the forward channel.

In some examples, a wireless transceiver apparatus includes multiple sets and/or subsets of antenna, a plurality of components coupled to one another to form transmit and receive chains, and a solicitor module circuit to transmit a sounding trigger, via a forward channel, to solicit multiple dedicated training signal from one or more beamformees. For example the dedicated training signals can be processed to improve subsequent transmissions of data to an associated beamformee (e.g., estimate a forward channel state information (CSI) for transmission of subsequent packets to associated beamformee).

The wireless transceiver with the solicitor module circuit generate the sounding trigger that indicates a control scheme (e.g., training options for a format of at least one of the multiple dedicated training signals based on communication parameters of a targeted beamformee). For example, communication parameters of a targeted beamformee include combination of one or more of a targeted beamformee capabilities, a traffic type, a positioning parameter, etc.

In further examples, the wireless transceiver with the solicitor module circuit may include a sounding module circuit coupled to the plurality of components. In other examples, a wireless without a transceiver solicitor module circuit may include a sounding module circuit coupled to the plurality of components. The sounding module circuit can process the dedicated training signals, for example when each received dedicated training signal, the sounding module circuit is to: measure channel information of the dedicated training signal received via a reverse channel, calculate a CSI for the reverse channel from the measured channel information, and derive the forward CSI for the forward channel from the CSI of the reverse channel in view of characteristics of a radio frequency front end of the transceiver.

In other examples, a wireless transceiver apparatus includes multiple sets and/or subsets of antenna, a plurality of components coupled to one another to form transmit and receive chains, and a sounding module circuit coupled to the multiple sets and/or subsets of antenna. The wireless transceiver in this example does not require a solicitor module circuit and can use dedicated training signals initially initiated by another wireless transceiver (e.g., a wireless transceiver with a solicitor module circuit). The sounding module circuit can detect at least one dedicated training signal from the one or more beamformees, wherein the at least one dedicated training signal is based on a sounding trigger from another beamformer.

The wireless transceiver apparatus of claim 15, wherein the sounding trigger indicates a sounding schedule with a time interval configured based on communication parameters of a targeted beamformee comprising at least one of: a targeted beamformee capabilities, a traffic type, and a positioning parameter.

Transmitting the at least one dedicated training signal can be performed by the communications interface 955 at timed intervals based on the sounding schedule indicated by the sounding trigger. In another example, transmitting at least one dedicated training signal can be based on monitoring for a preamble of other dedicated training signals from other receivers responding to the sounding trigger; deriving a packet length of the dedicated training signal based on the other dedicated training signals; and determining a response time based on the packet length.

In another embodiment, any of the described examples can include receiving at least one dedicated training signal with timing information. Such timing information can indicate packet transmit and receive timestamps. The timing information can be used for applications other than sounding processes such as motion tracking, location mapping, etc.

In this description, the term "computer readable medium" is used to refer to any non-transitory computer readable storage media used to provide computer executable code (e.g., software and computer programs) to the system 915. Examples of these media include main memory 930, secondary memory 935 (including internal memory 940, removable medium 945, and external storage medium 945), and any peripheral device communicatively coupled with communication interface 955 (including a network information server or other network device). These non-transitory computer readable mediums are means for providing executable code, programming instructions, and software to the system 915.

In an example implementation that is implemented using software, the software may be stored on a computer readable medium and loaded into the system 915 by way of removable medium 945, I/O interface 950, or communication interface 955. In such an example implementation, the software is loaded into the system 915 in the form of electrical communication signals 970.

In an example implementation, I/O interface 950 provides an interface between one or more components of system 915 and one or more input and/or output devices. Example input devices include, without limitation, keyboards, touch screens or other touch-sensitive devices, biometric sensing devices, computer mice, trackballs, pen-based pointing devices, and the like.

The system 915 also includes optional wireless communication components that facilitate wireless communication over a voice and over a data network. The wireless communication components comprise an antenna system 975, a radio system 980, and a baseband system 985. In the system 915, radio frequency (RF) signals are transmitted and received over the air by the antenna system 975 under the management of the radio system 980.

In one example implementation, the antenna system 975 may comprise one or more antennae and one or more multiplexors (not shown) that perform a switching function to provide the antenna system 975 with transmit and receive signal paths. In the receive path, received RF signals can be coupled from a multiplexor to a low noise amplifier (not shown) that amplifies the received RF signal and sends the amplified signal to the radio system 980.

In alternative example implementations, the radio system 980 may comprise one or more radios that are configured to communicate over various frequencies. In one example implementation, the radio system 980 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 980 to the baseband system 985.

If the received signal contains audio information, then baseband system 985 decodes the signal and converts it to an analog signal. Then the signal is amplified and sent to a speaker. The baseband system 985 also receives analog audio signals from a microphone. These analog audio signals are converted to digital signals and encoded by the baseband system 985. The baseband system 985 also codes the digital signals for transmission and generates a baseband transmit audio signal that is routed to the modulator portion of the radio system 980. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 975 where the signal is switched to the antenna port for transmission.

The baseband system 985 is also communicatively coupled with the processor 925. The central processing unit 925 has access to data storage areas 930 and 935. The central processing unit 925 is preferably configured to execute instructions (i.e., computer programs or software) that can be stored in the memory 930 or the secondary memory 935. Computer programs can also be received from the baseband processor 985 and stored in the data storage area 930 or in secondary memory 935, or executed upon receipt. Such computer programs, when executed, enable the system 915 to perform the various functions of the present invention as previously described. For example, data storage areas 930 may include various software modules (not shown).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs.

An example apparatus can include a Wireless Access Point (WAP) or a station and incorporating a very-large-scale integration (VLSI) processor and program code to support. An example transceiver couples via an integral modem to one of a cable, fiber or digital subscriber backbone connection to the Internet to support wireless communications, e.g., IEEE 802.11 compliant communications, on a Wireless Local Area Network (WLAN). The Wi-Fi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

The WAP and/or station can support multiple protocols and multilingual with the ability to communicate with multiple protocols, for example Internet of Things protocols including Bluetooth-Low-Energy, Zigbee, Thread, etc. and communicatively coupled to one or more resources for access to analytics or machine-learning capabilities. In some implementations, the WAP and/or station is battery powered and mobile or integrated a larger mobile device such as an automobile or airplane.

An example apparatus can be multiple-input multiple-output (MIMO) apparatus supporting as many as N×N discrete communication streams over N antennas. In an example the MIMO apparatus signal processing units can be implemented as N×N. In various examples, the value of N can be 4, 6, 8, 12, 16, etc. Extended MIMO operation enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

In some implementations, beamforming antenna configuration sounding discussed herein, may be applied with equal advantage to WAPs or stations with any number of transmit chains, receive chains, or MIMO antenna, including but not limited to: 1×2, 1×n, 2×3, 2×4, 2×n, 3×4, 3×n, 4×5, 4×8, 4×n, 8×9, 8×16, 8×n, etc.; without departing from the disclosure. The components and processes disclosed herein may be implemented in a combination of software, circuits, hardware, and firmware, integrated with the WAP's existing transmit and receive path components, and without departing from the scope of the disclosure.

Example transmit path/chain includes the following discrete and shared components. A Wi-Fi medium access control (WMAC) component includes: hardware queues for each downlink and uplink communication stream; encryption and decryption circuits for encrypting and decrypting the downlink and uplink communication streams; medium access circuit for making the clear channel assessment (CCA), and making exponential random backoff and re-transmission decisions; and a packet processor circuit for packet processing of the transmitted and received communication streams. The WMAC component has access to a node table which lists each node/station on the WLAN, the station's capabilities, the corresponding encryption key, and the priority associated with its communication traffic.

Each sounding or data packet for wireless transmission on the transmit path components to one or more stations is framed in the framer. Next each stream is encoded and scrambled in the encoder and scrambler followed by demultiplexing in demultiplexer into separate streams. Next streams are subject to interleaving and mapping in a corresponding one of the interleaver mappers. Next all transmissions are spatially mapped with a spatial mapping matrix (SMM) in the spatial mapper. The spatially mapped streams from the spatial mapper are input to Inverse Discrete Fourier Transform (IDFT) components for conversion from the frequency to the time domain and subsequent transmission in the AFT and RF stage.

A IDFT is coupled to a corresponding one of the transmit path/chain components in the AFT RF stage for wireless transmission on an associated one of MIMO antenna. Specifically each IDFT couples to an associated one of the digital-to-analog converters (DAC) 550 for converting the digital transmission to analog, filters, upconverters, coupled to a common voltage controlled oscillator (VCO) for upconverting the transmission to the appropriate center frequency of the selected channel(s), and power amplifiers for setting the transmit power level of the transmission on the MIMO antenna array.

The receive path/chain includes the following discrete and shared components. Received communications on the WAP's array of MIMO antenna are subject to RF processing including downconversion in the AFE-RF stage. There are six receive paths each including the following discrete and shared components: low noise amplifiers (LNA) for amplifying the received signal under control of an analog gain control (AGC) (not shown) for setting the amount by which the received signal is amplified, downconverters coupled to the VCO for downconverting the received signals, filters for bandpass filtering the received signals, analog-to-digital converters (ADC) for digitizing the downconverted signals. In an example implementation, an optional sampler 568 at the output of the ADCs allows sampling of the received Wi-Fi signals in the time domain, for subsequent Wi-Fi spatial diagnostics by the processor and non-volatile memory. The digital output from each ADC is passed to a corresponding one of the discrete Fourier transform (DFT) components in the baseband portion of the Wi-Fi stage for conversion from the time to the frequency domain.

Receive processing in the baseband stage includes the following shared and discrete components including: an equalizer to mitigate channel impairments which is coupled to the output of the DFTs. In an example implementation, the received Wi-Fi signals in the frequency domain from the output of the DFTs either with or without equalization are provided to the processor and non-volatile memory. The received Wi-Fi streams at the output of the equalizer are subject to demapping and deinterleaving in a corresponding number of the demappers and deinterleavers. Next the received stream(s) are multiplexed in multiplexer and decoded and descrambled in the decoder and descrambler component, followed by de-framing in the deframer. The received communication is then passed to the WMAC component where it is decrypted with the decryption circuit and placed in the appropriate upstream hardware queue for upload to the Internet.

A non-transitory computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

A computing device can be communicatively coupled to input/user interface and output device/interface. Either one or both of input/user interface and output device/interface can be a wired or wireless interface and can be detachable. Input/user interface may include any device, component, sensor, or interface, physical or virtual, that can be used to provide input (e.g., buttons, touchscreen interface, keyboard, a pointing/cursor control, microphone, camera, braille, motion sensor, optical reader, and/or the like).

The term "communicatively connected" is intended to include any type of connection, wired or wireless, in which data may be communicated. The term "communicatively connected" is intended to include, but not limited to, a connection between devices and/or programs within a single computer or between devices and/or separate computers over the network. The term "network" is intended to include, but not limited to, packet-switched networks such as local area network (LAN), wide area network (WAN), TCP/IP, (the Internet), and can use various means of transmission, such as, but not limited to, Wi-Fi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

Further, some example implementations of the present application may be performed solely in hardware, whereas other functions may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for operating a wireless transceiver, the method comprising:
   receiving a request to perform sounding on behalf of one or more beamformees;
   determining a sounding control scheme on behalf of the one or more beamformees;
   transmitting a sounding trigger to the one or more beamformees via a forward channel, the sounding trigger conveying aspects of the sounding control scheme, a training condition to be satisfied prior to the one or more beamformees is to respond to the sounding trigger, the training condition relating to at least one of a traffic type, location information, or a predicted dwell time; and
   receiving at least one dedicated training signal from the one or more beamformees via a reverse channel in response to the condition of the sounding trigger being satisfied and according to the sounding control scheme, the at least one dedicated training signal including a partial bandwidth training signal.

2. The method for operating the wireless transceiver of claim 1, wherein for each of the received dedicated training signal:
   estimating forward channel state information (CSI) derived based on the dedicated training signal from an associated beamformee; and wherein subsequent packets are precoded with precoding derived from the forward CSI for transmission to the associated beamformee via the forward channel.

3. The method for operating the wireless transceiver of claim 2, wherein estimating the forward CSI comprises:
   measuring channel information from the dedicated training signal received via the reverse channel;
   calculating a CSI for the reverse channel from the measured channel information; and
   deriving the forward CSI for the forward channel from the CSI for the reverse channel in view of characteristics of a radio frequency front end of the transceiver, wherein the subsequent packets are transmitted to the associated beamformee via the forward channel.

4. The method for operating the wireless transceiver of claim 1, wherein the receiving at least one dedicated training signal from the one or more beamformees comprises:
   receiving multiple dedicated training signals from the associated beamformee in response to the sounding trigger.

5. The method for operating the wireless transceiver of claim 4,
   wherein the sounding trigger indicates a sounding schedule for additional dedicated training signals from the associated beamformee based on the sounding control scheme, and
   wherein the multiple dedicated training signals from the associated beamformee are received at timed intervals based on the sounding schedule.

6. The method for operating the wireless transceiver of claim 1, wherein receiving at least one dedicated training signal from the one or more beamformees comprises:
   receiving multiple dedicated training signals from different beamformees in response to the sounding trigger.

7. The method for operating the wireless transceiver of claim 6,
   wherein the multiple dedicated training signals are received sequentially from the different beamformees, and
   wherein each of the different beamformees determine a response time based on a packet length of the dedicated training signal in view of the sounding trigger.

8. The method for operating the wireless transceiver of claim 6, wherein the sounding trigger indicates a separate spatial stream for each of the different beamformees to send the dedicated training signal; and wherein the multiple dedicated training signals are received simultaneously from the different beamformees on separate spatial streams.

9. The method for operating the wireless transceiver of claim 1, wherein the sounding trigger indicates a sounding schedule comprising at least one of: a sounding interval, a sounding position, and a schedule expiration.

10. The method for operating the wireless transceiver of claim 9, wherein the sounding schedule indicates sounding times for a group of beamformees to send dedicated training signals via the reverse channel.

11. The method for operating the wireless transceiver of claim 1, wherein the sounding trigger indicates training options for the beamformee to format the dedicated training signal including at least one of: repeated symbols, partial bandwidth, and a number of bits.

12. The method for operating the wireless transceiver of claim 1, wherein the sounding trigger indicates station information to enable different beamformees to send multiple dedicated training signals, wherein the station information comprising at least one of: a station list, a station identifier, and MAC address.

13. The method for operating the wireless transceiver of claim 1, further comprising:

transmitting additional sounding triggers to target additional beamformees, wherein a separate additional dedicated training signal is received from each of the additional beamformees in response to each additional sounding trigger.

14. The method for operating the wireless transceiver of claim 1, wherein the sounding trigger is not preceded by an announcement frame, and the dedicated training signal is a null data packet.

15. One or more non-transitory computer-readable media containing instructions which, when executed by one or more processors, cause a system to perform operations, the operations comprising:

receive a request to perform sounding on behalf of one or more beamformees;

determine a sounding control scheme on behalf of one or more beamformees;

transmit a sounding trigger to the one or more beamformees via a forward channel, the sounding trigger to convey an aspect of the sounding control scheme, wherein a training condition to be satisfied prior to the one or more beamformees is to respond to the sounding trigger, the training condition relating to at least one of a traffic type, location information, or a predicted dwell time; and receive at least one dedicated training signal from the one or more beamformees via a reverse channel in response to the condition being satisfied, the at least one dedicated training signal including a partial bandwidth training signal.

16. The one or more non-transitory computer-readable media of claim 15, wherein the operations further comprise, for each of the received dedicated training signals:

estimate forward channel state information (CSI) derived based on the dedicated training signal from an associated beamformee; and wherein subsequent packets are precoded with precoding derived from the forward CSI for transmission to the associated beamformee via the forward channel.

17. The one or more non-transitory computer-readable media of claim 16, wherein estimating the forward CSI comprises:

measuring channel information from the dedicated training signal received via the reverse channel;

calculating a CSI for the reverse channel from the measured channel information; and deriving the forward CSI for the forward channel from the CSI for the reverse channel in view of characteristics of a radio frequency front end of a transceiver, wherein the subsequent packets are transmitted to the associated beamformee via the forward channel.

18. The one or more non-transitory computer-readable media of claim 15, wherein the receiving at least one dedicated training signal from the one or more beamformees comprises:

receiving multiple dedicated training signals from the associated beamformee in response to the sounding trigger.

19. The one or more non-transitory computer-readable media of claim 18, wherein the sounding trigger indicates a sounding schedule for additional dedicated training signals from the associated beamformee, and wherein the multiple dedicated training signals from the associated beamformee are received at timed intervals based on the sounding schedule.

20. The one or more non-transitory computer-readable media of claim 15, wherein receiving at least one dedicated training signal from the one or more beamformees comprises:

receiving multiple dedicated training signals from different beamformees in response to the sounding trigger.

* * * * *